US012073611B2

(12) United States Patent
Mahbub et al.

(10) Patent No.: US 12,073,611 B2
(45) Date of Patent: Aug. 27, 2024

(54) APPARATUS AND METHODS FOR OBJECT DETECTION USING MACHINE LEARNING PROCESSES

(71) Applicant: QUALCOMM INCORPORATED, San Diego, CA (US)

(72) Inventors: Upal Mahbub, San Diego, CA (US); Gokce Dane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 17/561,299

(22) Filed: Dec. 23, 2021

(65) Prior Publication Data

US 2023/0206613 A1 Jun. 29, 2023

(51) Int. Cl.

| | |
|---|---|
| ***G06F 3/01*** | (2006.01) |
| ***G06V 10/25*** | (2022.01) |
| ***G06V 10/72*** | (2022.01) |
| ***G06V 10/764*** | (2022.01) |
| ***G06V 10/82*** | (2022.01) |
| *G06V 40/10* | (2022.01) |

(52) U.S. Cl.

CPC .............. *G06V 10/82* (2022.01); *G06V 10/25* (2022.01); *G06V 10/72* (2022.01); *G06V 10/764* (2022.01); *G06V 40/107* (2022.01)

(58) Field of Classification Search

CPC ........ G06F 17/18; G06N 3/08; G06N 3/0454; G06N 7/00; G06N 20/00; G06K 9/6256; G06K 9/623; G06T 7/75

See application file for complete search history.

(56) References Cited

U.S. PATENT DOCUMENTS

| | | | | |
|---|---|---|---|---|
| 2017/0262962 | A1 | 9/2017 | Rad et al. | |
| 2019/0171871 | A1* | 6/2019 | Zhang | G06V 40/103 |
| 2021/0365707 | A1 | 11/2021 | Mao et al. | |
| 2022/0083855 | A1* | 3/2022 | Choi | G06F 18/2113 |

OTHER PUBLICATIONS

International Search Report and Written Opinion—PCT/US2022/081296—ISA/EPO—Apr. 6, 2023.

* cited by examiner

*Primary Examiner* — Phuoc H Doan

(74) *Attorney, Agent, or Firm* — QUALCOMM Incorporated

(57) ABSTRACT

Methods, systems, and apparatuses are provided to automatically detect objects within images. For example, an image capture device may capture an image, and may apply a trained neural network to the image to generate an object value and a class value for each of a plurality of portions of the image. Further, the image capture device may determine, for each of the plurality of image portions, a confidence value based on the object value and the class value corresponding to each image portion. The image capture device may also detect an object within at least one image portion based on the confidence values. Further, the image capture device may output a bounding box corresponding to the at least one image portion. The bounding box defines an area of the image that includes one or more objects.

20 Claims, 10 Drawing Sheets

APPARATUS AND METHODS FOR OBJECT DETECTION USING MACHINE LEARNING PROCESSES

BACKGROUND

Field of the Disclosure

This disclosure relates generally to imaging devices and, more specifically, to detecting objects within captured images using machine learning processes.

Description of Related Art

Image capture devices, such as phones, tablets, and smart devices, may capture images and detect objects within those images for a variety of applications. For example, image capture devices can include facial detection technology that allows the image capture device to identify faces in a field-of-view of a camera's lens. The image capture device may then apply various signal-processing techniques based on the identified faces. In other examples, image capture devices may employ object detection techniques in virtual reality or augmented reality applications to detect various objects within a captured scene. For example, the image capture device may employ object detection processes to detect hands for hand pose estimation applications.

SUMMARY

According to one aspect, a method for detecting an object within a captured image includes obtaining image data from a camera of an image capture device. The method also includes applying a trained machine learning process to the image data to generate an object value and a class value for each of a plurality of image portions of the image. Further, the method includes determining, for each of the plurality of image portions, a confidence value based on the object value and the class value corresponding to each image portion. The method also includes detecting the object within at least one image portion of the plurality of image portions based on the confidence values.

According to another aspect, an image capture device comprises a non-transitory, machine-readable storage medium storing instructions, and at least one processor coupled to the non-transitory, machine-readable storage medium. The at least one processor is configured to execute the instructions to obtain image data from a camera of an image capture device. The at least one processor is also configured to execute the instructions to apply a trained machine learning process to the image data to generate an object value and a class value for each of a plurality of image portions of the image data. Further, the at least one processor is configured to execute the instructions to determine, for each of the plurality of image portions, a confidence value based on the object value and the class value corresponding to each image portion. The at least one processor is also configured to execute the instructions to detect an object within at least one image portion of the plurality of image portions based on the confidence values.

According to another aspect, a non-transitory, machine-readable storage medium stores instructions that, when executed by at least one processor, causes the at least one processor to perform operations that include obtaining image data from a camera of an image capture device. The operations also include applying a trained machine learning process to the image data to generate an object value and a class value for each of a plurality of image portions of the image. Further, the operations include determining, for each of the plurality of image portions, a confidence value based on the object value and the class value corresponding to each image portion. The operations also include detecting an object within at least one image portion of the plurality of image portions based on the confidence values.

According to another aspect, an image capture device includes: a means for obtaining image data from a camera of an image capture device; a means for applying a trained machine learning process to the image data to generate an object value and a class value for each of a plurality of image portions of the image; a means for determining, for each of the plurality of image portions, a confidence value based on the object value and the class value corresponding to each image portion; and a means for detecting an object within at least one image portion of the plurality of image portions based on the confidence values.

DETAILED DESCRIPTION

Figure 1:
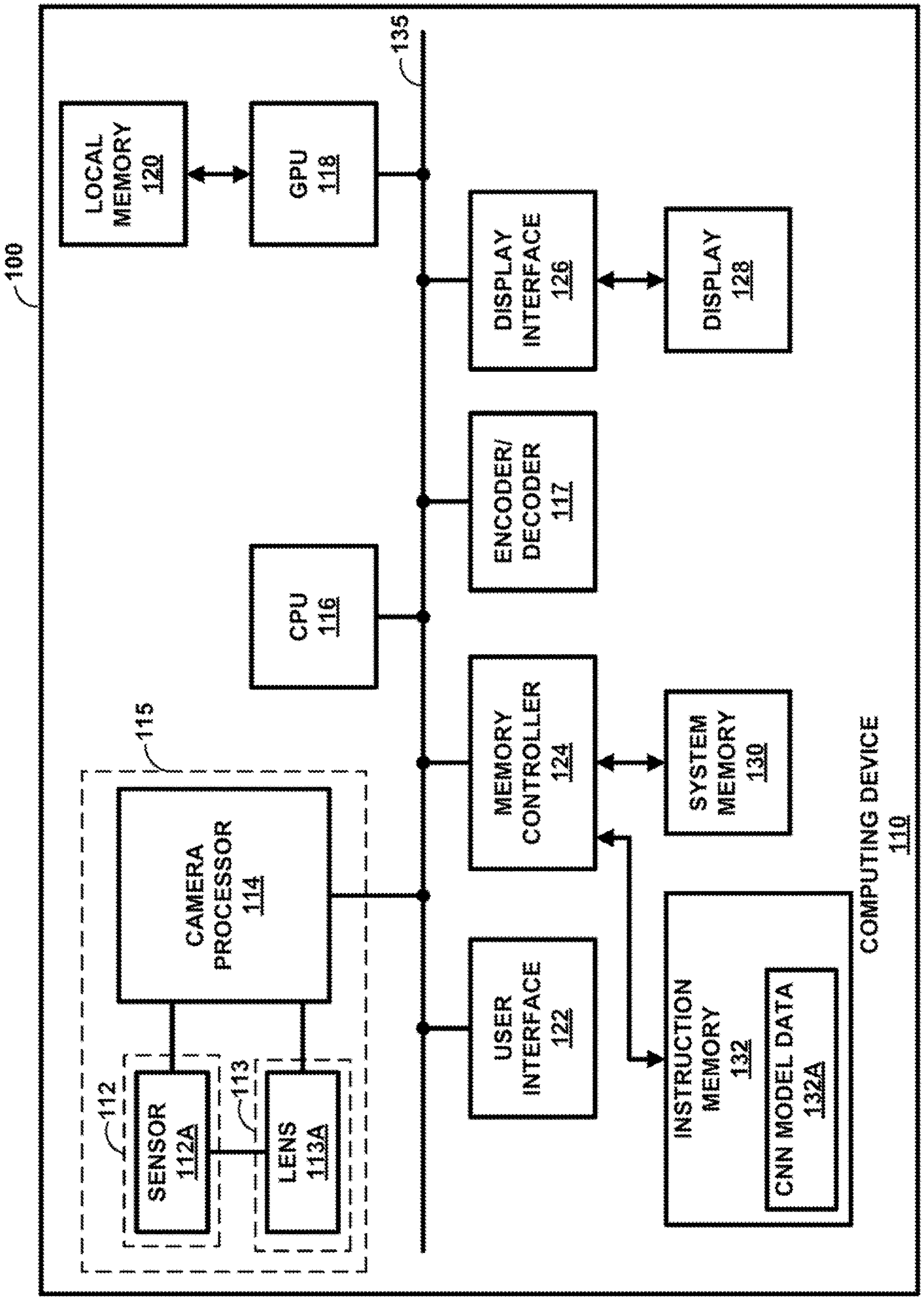
FIG. 1 is a block diagram of an exemplary image capture device, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

Many applications benefit from the detection of objects within images, such as within still images or video. For example, imaging devices, such as digital cameras, smartphones, tablet computers, laptop computers, automobiles, or Internet-of-things (IoT) devices (e.g., security cameras, etc.), may apply one or more image capture operations based on detected objects. The image capture operations can include, for example, automatic focus (AF), automatic exposure (AE), automatic gain (AG), automatic white balance (AWB), or any other suitable image processing operations. In other examples, virtual reality (VR) or augmented reality (AR) devices may employ object detection for a variety of reasons, such as to generate 3-dimensional models of real world objects. For example, a head mounted device may capture a scene that includes one or more hands, and may detect the hands to perform hand pose estimation processes.

In some implementations, an image capture device may include one or more optical elements, such as an assembly of one or more lenses (e.g., a lens assembly) that focus incident light onto an imaging sensor disposed at a corresponding imaging plane (e.g., an array of sensing elements formed within a semiconductor substrate). The imaging assemblies may also include a shutter that, when open, allows the incident light to reach sensing elements of the imaging sensor. Each of the sensing elements may collect incident light and generate an electrical signal, which characterizes and measures a value of a luminance of the incident light and, further, a chrominance of the incident light. For example, each of the sensing elements may include color-filtered photodiodes, e.g., to establish red, green, and blue (RGB) color channels. The image sensor may use various capture modes under various circumstances to capture frames of image data, such as video data or still images (e.g., snapshots).

Further, the image capture device may include one or more processors that apply a trained machine learning process, such as a neural network (e.g., a convolutional neural network (CNN)), to the frames of image data to detect one or more objects. The one or more processors may include, for example, a camera processor, a central processing unit (CPU), or a graphical processing unit (GPU). For example, and based on the execution of instructions stored in non-volatile memory, the one or more processors may apply a trained CNN to a frame of image data to generate and output bounding box data that defines an area of a captured image that includes one or more objects. For example, the bounding box data may include coordinate values (e.g., X and Y values), a height, and a width (e.g., in pixels). The image capture device can then apply any suitable image processing techniques based on the outputted bounding box.

To generate the bounding box, the CNN may be trained to generate, for one or more object classifications of a partition of the captured frame, an object value, a classification value, and bounding box data characterizing a corresponding bounding box. The bounding box defines at least a portion of the partition that includes the object. The object value may characterize a likelihood that the corresponding bounding box includes an object (e.g., any object). The classification value may characterize a likelihood that the object is of a particular classification (e.g., right hand, left hand, ball, car, etc.). Based on the object value and the classification value, the one or more processors may execute the instructions to determine whether the corresponding partition of the image includes an object of the corresponding classification.

For example, the one or more processors may execute the instructions to generate a class confidence score (e.g., confidence value) based on the partition's corresponding object value and classification value. The class confidence score may be a value characterizing a confidence level that the bounding box includes an object of the corresponding classification. In some examples, if the class confidence score is beyond (e.g., above) a predetermined threshold, the partition is deemed to include an object of the corresponding classification, and the one or more processors output the corresponding bounding box defining an area of the partition that includes the detected object. In some examples, a class confidence score is generated for each of a plurality of classifications. If no class confidence score is beyond the predetermined threshold, then the partition is deemed not to include any object of the plurality of classifications.

In some implementations, the machine learning model may be trained using supervised learning. For example, during training, the CNN may include "anchor boxes" that are not present during inference. The one or more processors may execute the instructions to train the CNN, which may generate class confidence scores for each of a plurality of convolutional layers of the CNN. For example, and for each convolutional layer of the CNN, the executed CNN generates a class confidence score for each of a plurality of possible classifications. Further, the executed CNN may generate, for each class confidence score, a corresponding bounding box. The one or more processors may execute the instructions to compare the generated bounding box with a ground truth bounding box to generate ground truth object values. For example, the one or more processors may execute the instructions to compute an intersection-over-union ratio (IOU) between the generated bounding boxes and their corresponding ground truth bounding boxes. The IOU ratio may indicate a percentage of a generated bounding box that intersects (e.g., is coincident with) a corresponding ground truth bounding box. Further, the one or more processes may execute the instructions to determine if the IOU ratio is beyond (e.g., above) a predetermined threshold. If an IOU ratio for a bounding box is beyond the predetermined threshold, the one or more processors execute the instructions to generate a ground truth object value indicating that the bounding box does include an object. Otherwise, if no IOU ratio for a bounding box is beyond the predetermined threshold, the one or more processors execute the instructions to generate a ground truth object value indicating that the bounding box does not include an object.

The one or more processors may execute the instructions to compare the generated object values, class confidence scores, and/or bounding boxes to the ground truth object values, ground truth confidence scores, and ground truth bounding boxes, respectively, to determine if the CNN is sufficiently trained. For example, the one or more processors may execute the instructions to compute one or more metrics, such as precision values, recall values, and area under curve (AUC) values, such as for receiver operating characteristic (ROC) curves or precision-recall (PR) curves.

In some examples, training is complete when the one or more metrics satisfy a predetermined threshold. In other examples, the one or more processors execute the instructions to apply the initially trained CNN to a validation set (e.g., a validation set of images), and may determine whether the initially trained CNN is sufficiently trained based on the object values, classification values, and bounding boxes generated during the validation. For example, the one or more processors may compute one or more metrics as described herein based on the object values, classification values, and bounding boxes generated during the validation. If the computed metrics indicate that the CNN is not sufficiently trained (e.g., the one or more computed metrics do not meet their corresponding thresholds), the one or more processors execute the instructions to continue training the CNN (e.g., with additional training images).

When training is complete, the one or more processors store values for configuration parameters, hyperparameters, and/or weights associated with the trained CNN in a data repository. The stored values for the configuration parameters, hyperparameters, and/or weights allow the one or more processors to configure the CNN (e.g., the trained CNN) for use during inference. For example, the one or more processors may obtain the configuration parameters, hyperparameters, and/or weights from the data repository, and may configure the CNN with the obtained configuration parameters, hyperparameters, and/or weights for inference.

Among other advantages, the embodiments described herein may allow for more accurate and robust object detection, for example, by reducing false positive detections. Further, the embodiments described herein may reduce processing power requirements, as during inference the anchor boxes are not utilized. Moreover, the embodiments described herein may be applied across a variety of applications, such as in imaging, VR and AR based applications.

In addition, the embodiments described herein can be applicable in applications where the number of objects for a finite number of classes are known beforehand. For such problems, the trained machine learning processes do not require the branches for anchor boxes during inference, thereby providing more efficient object classification solutions. Persons of ordinary skill in the art having the benefit of these disclosures would recognize these and other benefits as well.

FIG. 1 is a block diagram of an exemplary image capture device 100. The functions of image capture device 100 may be implemented in one or more processors, one or more field-programmable gate arrays (FPGAs), one or more application-specific integrated circuits (ASICs), one or more state machines, digital circuitry, any other suitable circuitry, or any suitable hardware. Image capture device 100 may perform one or more of the example functions and processes described in this disclosure. Examples of image capture device 100 include, but are not limited to, a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, a virtual reality device (e.g., a virtual reality headset), an augmented reality device (e.g., augmented reality glasses), or any device that may include one or more cameras.

As illustrated in the example of FIG. 1, image capture device 100 may include one or more image sensors 112, such as image sensor 112A, one or more lenses 113, such as lens 113A, and one or more camera processors, such as camera processor 114. In some instances, camera processor 114 may be an image signal processor (ISP) that employs various image processing algorithms to process image data (e.g., as captured by corresponding ones of these lenses and sensors). For example, camera processor 114 may include an image front end (IFE) and/or an image processing engine (IPE) as part of a processing pipeline. Further, a camera 115 may refer to a collective device including one or more image sensors 112, one or more lenses 113, and one or more camera processors 114.

In some examples, one image sensor 112 may be allocated for each lens 113. In some examples, each of a multiple image sensors 112 may be allocated to a lens 113 of a different type (e.g., wide lens, ultra-wide lens, telephoto lens, and/or periscope lens, etc.). For example, a wide lens 113 may correspond to a first image sensor 112 of a first size (e.g., 108 MP), whereas an ultra-wide lens 113 may correspond to a second image sensor 112 of a different size (e.g., 16 MP). In another example, a telephoto lens 113 may correspond to an image sensor 112 of a third size (e.g., 12 MP). In an illustrative example, a single image capture device 100 may include two or more cameras 115, where at least two of the cameras 115 correspond to image sensors 112 having a same size (e.g., two 12 MP sensors, three 108 MP sensors, three 12 MP sensors, two 12 MP sensors and a 108 MP sensor, etc.). In some examples, a single image sensor 112 may correspond to multiple lenses 113. For example, each of one or more image sensors 112 may correspond to different lenses 113 so as to provide multiple cameras 115 to image capture device 100.

In some examples, not illustrated in FIG. 1, image capture device 100 may include multiple cameras (e.g., a mobile phone having one or more front-facing cameras and one or more rear-facing cameras). For instance, image capture device 100 may include a first camera, such as camera 115 that includes a 16 MP image sensor, a second camera that includes a 108 MP image sensor, and a third camera that includes a 12 MP image sensor.

In some examples, image capture device 100 may include multiple cameras facing in different directions. For example, image capture device 100 may include dual "front-facing" cameras. Additionally, in some examples, image capture device 100 may include a "front-facing" camera, such as camera 115, and a "rear-facing" camera. In other examples, image capture device 115 may include dual "front-facing" cameras, which may include camera 115, and a "rear-facing" camera. In further examples, image capture device 115 may include three "front-facing" cameras, such as camera 115. In yet other examples, image capture device 115 may include three "front-facing" cameras, and one, two, or three "rear-facing" cameras. It should be noted that a person of skill in the art will appreciate that the techniques of this disclosure may be implemented for any type of camera and for any transitions between any number of cameras of image capture device 100.

In some instances, each camera 115 may include multiple camera processors 114. In some instances, camera processor 114 may be an image signal processor (ISP) that employs various image processing algorithms to process image data (e.g., as captured by lens 113 and sensor 112). In some examples, camera processor 114 may include an image front end (IFE) and/or an image processing engine (IPE) as part of a processing pipeline. In addition, camera 115 may include a single sensor 112 and a single lens 113, in some examples.

As illustrated, image capture device 100 may further include a central processing unit (CPU) 116, an encoder/decoder 117, a graphics processing unit (GPU) 118, a local memory 120 of GPU 118, a user interface 122, a memory controller 124 that provides access to system memory 130 and to instruction memory 132, and a display interface 126 that outputs signals that causes graphical data to be displayed on display 128.

Each of the image sensors 112, including image sensor 112A, may represent an image sensor that includes processing circuitry, an array of pixel sensors (e.g., pixels) for capturing representations of light, memory, an adjustable lens (such as lens 113), and an actuator to adjust the lens. By way of example, image sensor 112A may be associated with, and may capture images through, a corresponding one of lenses 113, such as lens 113A. In other examples, additional, or alternate, ones of image sensors 112 may be associated with, and capture images through, corresponding additional ones of lenses 113.

In some instances, image sensors 112 may include a monochrome sensor (e.g., a "clear" pixel sensor) and/or a color sensor (e.g., a Bayer sensor). For example, a monochrome pixel sensor may be established through a disposition of a monochrome filter over image sensor 112A. Further, in some examples, a color pixel sensor may be established through a disposition of a color filter, such as a Bayer filter, disposed over image sensor 112A, or through a disposition of a red filter, a green filter, or a blue filter may over image sensor 112A. Various other filter patterns exist, such as red, green, blue, white ("RGBW") filter arrays; cyan, magenta, yellow, white (CMYW) filter arrays; and/or variations thereof, including proprietary or non-proprietary filter patterns. Although this disclosure discusses certain examples in terms of particular filter patterns, other filter patterns may be used in accordance with the techniques of this disclosure.

Image sensors 112 may also include a subset of two or more different image sensors operating in conjunction with one another. For example, image sensors 112 may include two different "color" pixel sensors operating in conjunction with one another. The different color pixel sensors may support different binning types and/or binning levels, and although operating in conjunction with one another, the different color pixel sensors may each operate with respect to a particular range of zoom levels. Further, within each zoom level range, each of the different color pixel sensors may transition between various binning levels (e.g., transition from binning to non-binning modes). For example, camera processor 114 may cause two or more of image sensors 112 operating in conjunction with one another (e.g., the different color pixel sensors described herein) to each transition between various binning levels independently and in accordance with a respective binning transition thresholds, e.g., as stored in system memory 130.

Further, in some examples, multiple ones of lenses 113 may be associated with, and disposed over, respective subsets of image sensors 112. For instance, a first subset of sensors 112 may be allocated to a first one of lenses 113 (e.g., a wide lens camera, ultra-wide lens camera, telephoto lens camera, periscope lens camera, etc.), and a second subset of image sensors 112 may be allocated to a second one of lenses 113 distinct from the first subset. In some instances, each of lenses 113 may serve respective functions as provided by various attributes of the cameras (e.g., lens attributes, aperture attributes, angle-of-view attributes, thermal imaging attributes, etc.), and a user of image capture device 100 may leverage the various attributes of each of lenses 113 to capture one or more images or sequences of images (e.g., as in a video recording).

Additionally, in some instances, image capture device 100 may receive user input via user interface 132, and response to the received user input, CPU 116 and/or camera processor 114 may activate respective ones of lenses 113, or combinations of lenses 113. For example, the received user input may corresponding a user selection of lens 113A (e.g., a fisheye lens), and based on the received user input, CPU 116 may select an initial one of lenses 113 to activate and additionally, or alternatively, may transition from the initially selected lens to another one of lenses 113.

In other examples, CPU 116 and/or camera processor 114 may detect an operating condition that satisfies certain lens-selection criteria (e.g., digital zoom level satisfying a predefined camera transition threshold, a change in lighting conditions, input from a user calling for a particular lens 13, etc.), and may select the initial one of lenses 113, such as lens 113A, for activation based on the detected operating condition. In some examples, image capture device 100 may include multiple ones of camera 115, which may collectively capture one synthetic image or stream of synthetic images, such that camera processor 114 or CPU 116 may process one synthetic image or stream of synthetic images based on image data captured from sensors 112.

In some examples, each of lenses 113 and image sensors 112 may operate collectively to provide various optical zoom levels, angles of view (AOV), focal lengths, and FOVs. Further, light guides may be used to direct incident light from lenses 113 to a respective one of sensors 112, and examples of the light guides may include, but are not limited to, a prism, a moving prism, or one or more mirrors. For instance, light received from lens 113A may be redirected from image sensor 112A toward another one of image sensors 112. Further, in some instances, camera processor 114 may perform operations that cause a prism to move and redirect light incident lens 113A in order to effectively change the focal length for the received light.

Further, as illustrated in FIG. 1, a single camera processor, such as camera processor 114, may be allocated to and interface with all, or a selected subset, of image sensors 112. In other instances, multiple camera processors may be allocated to and interface with all, or a selected subset, of image sensors 112, and each of the camera processors may coordinate with one another to efficiently allocate processing resources to the all, or the selected subset, of image sensors 112. For example, and through the execution of stored instructions, camera processor 114 may implement multiple processing algorithms under various circumstances to perform digital zoom operations or other image processing operations.

Although the various components of image capture device 100 are illustrated as separate components, in some examples, the components may be combined to form a system on chip (SoC). As an example, camera processor 114, CPU 116, GPU 118, and display interface 126 may be implemented on a common integrated circuit (IC) chip. In some examples, one or more of camera processor 114, CPU 116, GPU 118, and display interface 126 may be implemented in separate IC chips. Various other permutations and combinations are possible, and the techniques of this disclosure should not be considered limited to the example illustrated in FIG. 1.

System memory 130 may store program modules and/or instructions and/or data that are accessible by camera processor 114, CPU 116, and GPU 118. For example, system memory 130 may store user applications (e.g., instructions for the camera application) and resulting images from camera processor 114. System memory 130 may additionally store information for use by and/or generated by other components of image capture device 100. For example, system memory 130 may act as a device memory for camera processor 114. System memory 130 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media, cloud-based storage medium, or an optical storage media.

Camera processor 114 may store data to, and read data from, system memory 130. For example, camera processor 114 may store a working set of instructions to system memory 130, such as instructions loaded from instruction memory 132. Camera processor 114 may also use system memory 130 to store dynamic data created during the operation of image capture device 100.

Similarly, GPU 118 may store data to, and read data from, local memory 120. For example, GPU 118 may store a working set of instructions to local memory 120, such as instructions loaded from instruction memory 132. GPU 118 may also use local memory 120 to store dynamic data created during the operation of image capture device 100. Examples of local memory 120 include one or more volatile or non-volatile memories or storage devices, such as RAM, SRAM, DRAM, EPROM, EEPROM, flash memory, a magnetic data media, a cloud-based storage medium, or an optical storage media.

Instruction memory 132 may store instructions that may be accessed (e.g., read) and executed by one or more of camera processor 114, CPU 116, and GPU 118. For example, instruction memory 132 may store instructions that, when executed by one or more of camera processor 114, CPU 116, and GPU 118, cause one or more of camera processor 114, CPU 116, and GPU 118 to perform one or more of the operations described herein. For instance, instruction memory 132 can include CNN model data 132*a* that, when executed by one or more of camera processor 114, CPU 116, and GPU 118, cause camera processor 114, CPU 116, and GPU 118 to execute a corresponding CNN. CNN model data 132*a* may father include, in some examples, configuration parameters, hyperparameters, and weights associated with the CNN (e.g., with the trained CNN). Instruction memory 132 may also store instructions that, when executed by one or more of camera processor 114, CPU 116, and GPU 118, cause one or more of camera processor 114, CPU 116, and GPU 118 to perform image processing operations, such as one or more of AF, AE, AG, or AWB. Instruction memory 130 may include read-only memory (ROM) such as EEPROM, flash memory, a removable disk, CD-ROM, any non-volatile memory, any non-volatile memory, or any other suitable memory.

The various components of image capture device 100, as illustrated in FIG. 1, may be configured to communicate with each other across bus 135. Bus 135 may include any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus), or another type of bus or device interconnect. It is to be appreciated that the specific configuration of components and communication interfaces between the different components shown in FIG. 1 is merely exemplary, and other configurations of the components, and/or other image processing systems with the same or different components, may be configured to implement the operations and processes of this disclosure.

Camera processor 114 may be configured to receive image frames (e.g., pixel data, image data) from image sensors 112, and process the image frames to generate image and/or video content. For example, image sensor 112A may be configured to capture individual frames, frame bursts, frame sequences for generating video content, photo stills captured while recording video, image previews, or motion photos from before and/or after capture of a still photograph. CPU 116, GPU 118, camera processor 114, or some other circuitry may be configured to process the image and/or video content captured by image sensor 112A into images or video for display on display 128. In an illustrative example, CPU 116 may cause image sensor 112A to capture image frames, and may receive pixel data from image sensor 112A. In the context of this disclosure, image frames may generally refer to frames of data for a still image or frames of video data or combinations thereof, such as with motion photos. Camera processor 114 may receive, from image sensors 112, pixel data of the image frames in any suitable format. For instance, the pixel data may be formatted according to a color format such as RGB, YCbCr, or YUV.

In some examples, camera processor 114 may include an image signal processor (ISP). For instance, camera processor 114 may include an ISP that receives signals from image sensors 112, converts the received signals to image pixels, and provides the pixel values to camera processor 114. Additionally, camera processor 114 may be configured to perform various operations on image data captured by image sensors 112, including auto gain, auto white balance, color correction, or any other image processing operations.

Memory controller 124 may be communicatively coupled to system memory 130 and to instruction memory 132. Memory controller 124 may facilitate the transfer of data going into and out of system memory 130 and/or instruction memory 132. For example, memory controller 124 may receive memory read and write commands, such as from camera processor 114, CPU 116, or GPU 118, and service such commands to provide memory services to system memory 130 and/or instruction memory 132. Although memory controller 124 is illustrated in the example of FIG. 1 as being separate from both CPU 116 and system memory 130, in other examples, some or all of the functionality of memory controller 124 with respect to servicing system memory 130 may be implemented on one or both of CPU 116 and system memory 130. Likewise, some or all of the functionality of memory controller 124 with respect to servicing instruction memory 132 may be implemented on one or both of CPU 116 and instruction memory 132.

Camera processor 114 may also be configured, by executed instructions, to analyze image pixel data and store resulting images (e.g., pixel values for each of the image pixels) to system memory 130 via memory controller 124. Each of the images may be further processed for generating a final image for display. For example, GPU 118 or some other processing unit, including camera processor 114 itself, may perform color correction, white balance, blending, compositing, rotation, digital zoom, or any other operations to generate the final image content for display.

In addition, image capture device 100 may include a video encoder and/or video decoder 117, either of which may be integrated as part of a combined video encoder/decoder (CODEC). Encoder/decoder 117 may include a video coder that encodes video captured by one or more camera(s) 115 or a decoder that decodes compressed or encoded video data. In some instances, CPU 116 may be configured to encode and/or decode video data using encoder/decoder 117.

CPU 116 may comprise a general-purpose or a special-purpose processor that controls operation of image capture device 100. A user may provide input to image capture device 100 to cause CPU 116 to execute one or more software applications. The software applications executed by CPU 116 may include, for example, a camera application, a graphics editing application, a media player application, a video game application, a graphical user interface application or another program. For example, an executed camera application may allow the user to control various settings of camera 115, e.g., via input provided to image capture device 100 via user interface 122. Examples of user interface 122 include, but are not limited to, a pressure-sensitive touch-screen unit, a keyboard, a mouse, or an audio input device, such as a microphone. For example, user interface 122 may receive input from the user to adjust desired zoom levels (e.g., digital zoom levels), alter aspect ratios of image data, record video, take a snapshot while recording video, apply filters when capturing images, select a region-of-interest (ROI) (e.g., a FOZ) for AF, AE, AG, or AWB operations, record slow motion video or super slow motion video, apply night shot settings, and/or capture panoramic image data, among other examples.

By way of example, CPU 116 may execute the camera application and, the executed camera application may cause CPU 116 to generate content that is displayed on display 128. For instance, display 128 may display information such as a preview of an image as captured by one or more of sensors 112, a configured light intensity, whether flash is enabled, and other such information. The user of image capture device 100 may interface with display 128 (e.g., via user interface 122) to configure the manner in which the images are generated (e.g., with or without flash, focus settings, exposure settings, gain settings, white balance settings, as well as other settings or parameters). The executed camera application may also cause CPU 116 to instruct camera processor 114 to process the images captured by sensor 112 in a user-defined manner. For example, CPU 116 may instruct camera processor 114 to perform a zoom operation on the images captured by one or more of sensors 112, e.g., in response to a request to zoom provided by the user via user interface 122. The request for zoom may include, but is not limited to, a pinch-to-zoom command, a discrete input, such as operation of a 0.5× zoom button, 2× zoom button, 3× zoom button, 10× zoom button, etc., a slider input, or some combination thereof.

Further, in some examples, a zoom operation may include a digital zoom defined by a zoom field (e.g., the FOZ described herein). For instance, a zoom field may include a portion of less than the full FOV of sensor 112. CPU 116 may instruct camera processor 114 to perform the digital zoom operation based on the zoom field.

As described herein, one or more of CPU 116 and GPU 118 may perform operations that apply a trained machine learning process, such as the CNN characterized by CNN model data **132*a* stored in instruction memory 132, to a frame of image data captured by one or more of image sensors 112. For example, CNN model data 132*a*** may characterize a trained CNN model that includes a plurality of convolutional layers. Each convolutional layer may be associated with a different resolution of the image data. For example, a first convolutional layer may operate on a 256 pixel by 256 pixel portion of the image data to produce output data. The output data may be "pooled" to generate 128 pixel by 128 pixel input data for a second convolutional layer. The second convolutional layer may operate on the 128 pixel by 128 pixel portion of the image data to produce additional output data. The additional output data may be "pooled" to generate 64 pixel by 64 pixel input data for a third convolutional layer. The trained CNN may include any number of convolutional layers.

The trained CNN may further include a flattening layer and a linear layer. The flattening layer may operate on the output data generated from the convolutional layers to generate a feature vector. For example, the flattening layer may convert the output data from the convolutional layers into a one-dimensional array. Further, the linear layer may operate on the feature vector generated by the flattening layer to generate a fully connected layer that provides an object value, a classification value for one or more classes, and a corresponding bounding box.

As described herein, the one or more of CPU 116 and GPU 118 may determine, based on the object value and the classification values, whether the bounding box includes an object. For example, the one or more of CPU 116 and GPU 118 may determine, for each classification, a class confidence score based on the object value and the corresponding classification value. For instance, the one or more of CPU 116 and GPU 118 may multiply the object value and the corresponding classification value to generate the class confidence score for each classification. Further, the one or more of CPU 116 and GPU 118 may perform operations to determine whether the portion of the image defined by the bounding box includes an object of the corresponding classification (e.g., class type, class label) based on the corresponding class confidence score. For instance, the one or more of CPU 116 and GPU 118 may compare the class confidence score to a predetermined threshold, may determine that the bounding box includes an object of the corresponding classification when the class confidence score exceeds the predetermined threshold, and may output the bounding box. In some examples, one or more of one or more of CPU 116 and GPU 118 may perform additional image processing operations based on the output bounding box (e.g., such as performing one or more of AF, AG, AE, and/or AWB within, or outside of, the image area defined by the bounding box.

Figure 2:
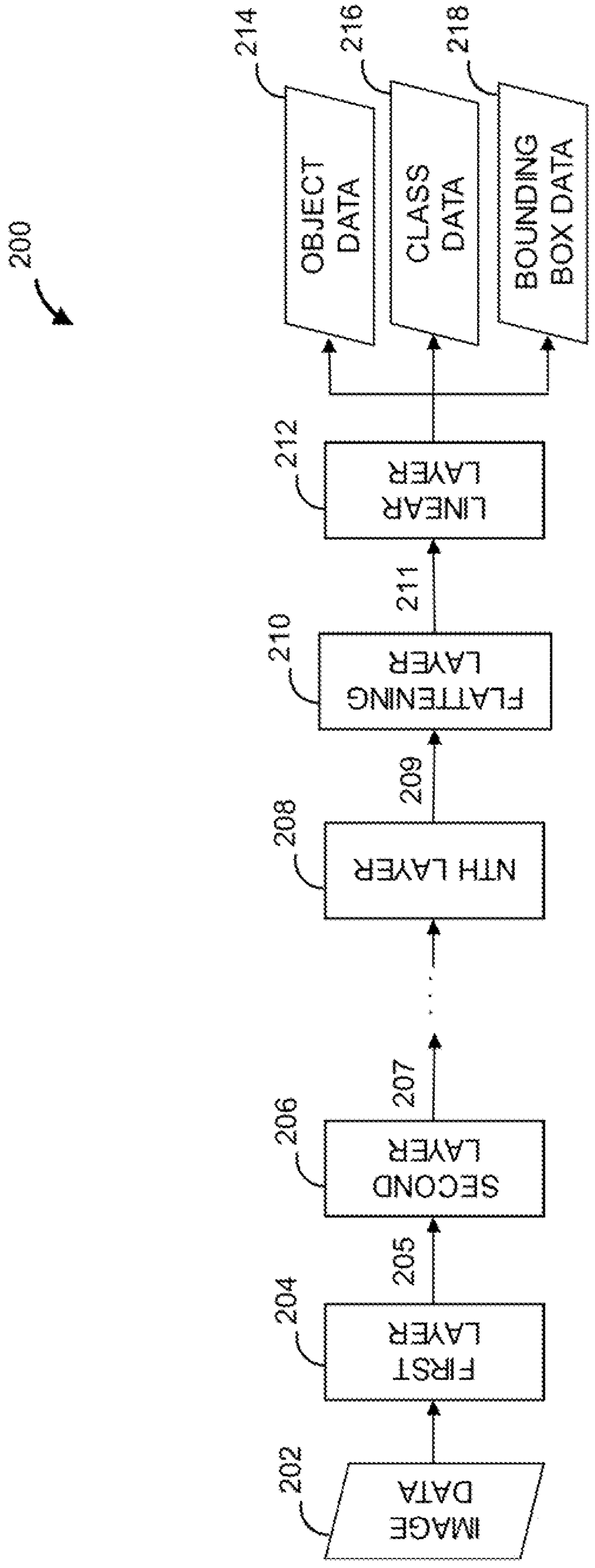
FIGS. 2 and 3 are block diagram of exemplary neural networks, according to some implementations.

FIG. 2 is a block diagram of an exemplary trained neural network model 200, such as one characterized by CNN model data **132*a* stored in instruction memory 132. Image capture device 100 may establish the exemplary trained neural network 200, and its corresponding layers and nodes within the layers, in accordance with CNN model data 132*a*. For example, image capture device 100 may obtain at least portions of CNN model data 132*a* from instruction memory 132, and execute the obtained portions to implement trained neural network model 200. The trained neural network model 200 is trained and configured to generate bounding box data 218 characterizing a bounding box, object data 214 characterizing a likelihood (e.g., probability) that the bounding box includes an object, and class data 216** characterizing a likelihood that the object is of a corresponding class (e.g., a particular class type).

As illustrated, neural network model 200 includes multiple convolutional layers including first layer 204, second layer 206, and $N^{th}$ layer 208. First layer 204 is configured to receive image data 202, and operate image data 202 to generate first layer output data 205. Image data 202 may include at least portions of image data captured with a camera 115. In some examples, image data 202 represents one channel, such one of the RGB, YCbCr, or YUV color channels. For example, image capture device 100 may provide image data from each of the three color channels each of multiple executed neural networks 200 in real-time. Further, and as described herein, first layer output data 205 may be "pooled" (e.g., down sampled) such that first layer output data 205 is of a reduced size with respect to image data 202 (e.g., 128×128 pixels vs. 256×256 pixels).

Similarly, second layer 206 may operate on first layer output data 205 to generate second layer output data 207. Second layer output data 207 may also be "pooled" such that second layer output data 207 is of a reduced size with respect to first layer output data 205 (e.g., 64×64 pixels vs. 128×128 pixels). Further, $N^{th}$ layer 208 (which represents that neural network 200 may include any number of suitable convolutional layers) may operate on second layer output data 207 to generate $N^{th}$ layer output data 209. $N^{th}$ layer output data 209 may further be "pooled" such that $N^{th}$ layer output data 209 is of a reduced size with respect to second layer output data 207 (e.g., 32×32 pixels vs. 64×64 pixels).

Flattening layer 210 is configured to receive $N^{th}$ layer output data 209 from $N^{th}$ layer 208, and perform operations to generate a feature vector 211 which, in some examples, may characterize a one-dimensional array of features. Further, linear layer 212 is configured to receive the feature vector 211 from the flattening layer 210 and, based on the received feature vector 211, generate one or more fully-connected layers that provide the object data 214 (e.g., characterizing objectness), the class data 216 (e.g., characterizing class labels), and the bounding box data 218 (e.g., characterizing bounding boxes). In some examples, the flattening layer 210 provides fully connected branches for objectness, class labels, and bounding boxes. For example, object data 214 may characterize one or more fully connected branches for objectness. Similarly, class data 218 may characterize one or more fully connected branches for class labels, and bounding box data 218 may characterize one or more fully connected branches for bounding boxes.

In some implementations, class data 216 includes multiple values, each value characterizing a likelihood that an object within the bounding box characterized by bounding box data 218 is of a particular class type. For example, class data 216 may include a first value corresponding to a first class type, a second value corresponding to a second class type, and so on for a predetermined number of class types. Further, in some implementations, image capture device 100 applies the trained neural network 200 to each of a plurality of portions of a captured image. For example, image data 202 may represent a portion of a captured image (e.g., the top left 1/16$^{th}$ of the captured image). Image capture device 100 may apply the trained neural network 200 to each of the plurality of portions of the captured image (e.g., to process the entire captured image), or to a subset of the plurality of portions of the captured image (e.g., only to middle portions of a captured image).

Further, image capture device 100 may determine whether the bounding box characterized by bounding box data 218 includes an object of the classification type associated with class data 216 based object data 214 and class data 216. For example, and as described herein, object data 214 may include an object value that characterizes a likelihood (e.g., probability) that the bounding box includes an object, and class data 216 may include a classification value characterizing a likelihood that the object is of a particular class. Image capture device 100 may determine whether the bounding box includes an object of the particular class based on the object and classification values. For example, image capture device 100 may multiply the object value and the classification value to generate a class confidence score (e.g., class confidence score=object value*classification value). In some examples, image capture device 100 applies a corresponding weight to one or more of the object value and the classification value, and determines the class confidence score based on the weighted object and classification values. For example, image capture device 100 may apply a first weight to the object value, and a second weight to the classification value, and multiply the weighted scores to generate the class confidence score. In some examples, the first weight is the same as or greater than the second weight. In other examples, the second weight is greater than the first weight.

Further, the image capture device 100 may determine whether the class confidence score for a particular class is above a threshold. If the image capture device 100 determines that the class confidence score is above the threshold, the image capture device 100 determines that the bounding box includes an object of the particular class, and outputs the bounding box characterized by the corresponding bounding box data 218 as well as, in some examples, an indication of the particular class. Otherwise, if the class confidence score is not above the threshold, the image capture device 100 determines that the bounding box does not include an object of the particular type, and does not output the corresponding bounding box. In some examples, the image capture device 100 applies the same threshold value regardless of the particular class. In other examples, each class may have a corresponding threshold, which may differ from one or more threshold values corresponding to other classes. For example, a user may configure the threshold values via user interface 122, and the threshold values may be stored in instruction memory 132.

Figure 3:
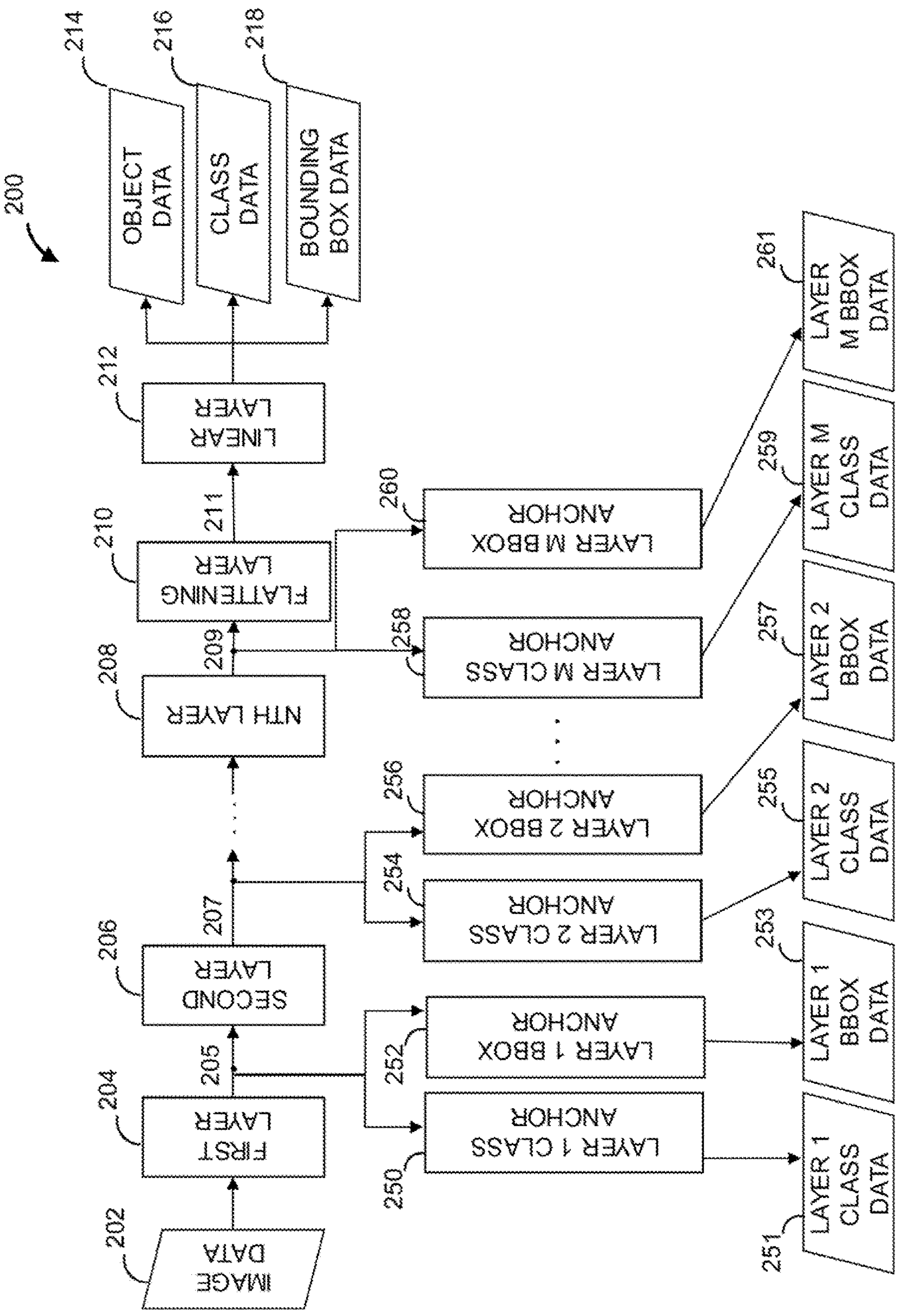

FIG. 3 illustrates the training of a neural network 200 according to some implementations. In some implementations, image capture device 100 trains neural network 200 with a plurality of images. Each of the plurality of images may include one or more objects to be detected. As illustrated in FIG. 3, the neural network 200 includes the convolutional layers discussed with respect to FIG. 2, namely, first layer 204, second layer 206, and N$^{th}$ layer 208. Neural network 200 also includes the flattening layer 211 and the linear layer 212. To train neural network 200, however, neural network 200 includes additional components. Specifically, neural network 200 further includes a classification anchor and a bounding box anchor that operates on the output data of each of the convolutional layers. For example, and as illustrated, neural network 200 includes first layer class anchor 250 and first layer bounding box ("bbox") anchor 252 that each operate on first layer output data 205. Similarly, neural network 200 includes second layer class anchor 254 and second layer bounding box anchor 256 that each operate on second layer output data 207. Further, neural network 200 includes N$^{th}$ layer class anchor 258 and N$^{th}$ layer bounding box anchor 260 that each operate on N$^{th}$ layer output data 209.

During training, each classification anchor generates output data characterizing a prediction of whether its input data includes an object of one or more classifications. For example, first layer class anchor 250 may operate on first layer output data 205 to generate first layer class data 251 characterizing a value indicative of whether the first layer output data 205 includes an object of a particular classification. Similarly, second layer class anchor 254 may operate on second layer output data 207 to generate second layer class data 255 characterizing a value indicative of whether the second layer output data 207 includes an object of the particular classification. Further, N$^{th}$ layer class anchor 258 may operate on N$^{th}$ layer output data 209 to generate N$^{th}$ layer class data 259 characterizing a value indicative of whether the N$^{th}$ layer output data 209 includes an object of the particular classification. In some implementations, one or more of first layer class data 251, second layer class data 255, and N$^{th}$ layer class data 259 include a value for each of a plurality of possible classifications.

Further, each bounding box anchor generates output data characterizing a bounding box that may include an object. For example, first layer bounding box anchor 252 may operate on first layer output data 205 to generate first layer bounding box data 253 characterizing a bounding box that may include an object. Similarly, second layer bounding box anchor 256 may operate on second layer output data 207 to generate second layer bounding box data 257 characterizing a bounding box that may include an object. Further, N$^{th}$ layer bounding box anchor 260 may operate on N$^{th}$ layer output data 209 to generate N$^{th}$ layer bounding box data 261 characterizing a bounding box that may include an object. As such, during training, and for each convolutional layer of neural network 200, image capture device 100 generates classification data characterizing a likelihood that an object exists within the output data of the convolutional layer, as well as bounding box data characterizing a bounding box that includes the object.

In some implementations, each class anchor and bounding box anchor is associated with a corresponding weight (e.g., a scaling factor). The weights are used to scale the class anchors and bounding box anchors to the scale of the input image. The weights may differ, and may be predefined and stored in instruction memory 132, for example. For instance, a user may configure the weights using user interface 132, and CPU 116 may store the weights within instruction memory 132. Image capture device 100 may obtain the configured weights from instruction memory 132, and configure the class anchors and bounding boxes with the corresponding weights. Image capture device 100 may apply the weights to the class anchors and bounding box anchors to scale to the input data to generate the corresponding output data. For example, first layer class anchor 250 may apply a first layer class weight to first layer output data 205 to generate first layer class data 251. Similarly, first layer bounding box anchor 252 may apply a first layer bounding box weight to the first layer output data 205 to generate first layer bounding box data 253. Each of second layer class data 255, $N^{th}$ layer class data 259, second layer bounding box data 257, and $N^{th}$ layer bounding box data 261 may be generated similarly.

Further, and based on the generated classification data and bounding box data generated by the classification and bounding box anchors, respectively, image capture device 100 may generate object ground truth data. For example, image capture device 100 may compute an intersection-over-union (IOU) ratio between each of the generated bounding boxes (i.e., as characterized by first layer bounding box data 253, second layer bounding box data 257, and $N^{th}$ layer bounding box data 261) and corresponding ground truth bounding boxes (e.g., which may be stored in instruction memory 132). If the computed IOU is above a predetermined threshold (e.g., 50%), image capture device 100 generates corresponding object ground truth data indicating an object does exist within the bounding box (e.g., object ground truth=1). Otherwise, if the computed IOU is not above the predetermined threshold, image capture device 100 generates corresponding object ground truth data indicating an object does not exist within the bounding box (e.g., object ground truth=0).

In some implementations, the generated object ground truth data is provided as an input to neural network 200 during supervised training. For example, image capture device 100 may provide the convolutional layers with the object ground truth data indicating whether an object exists within the corresponding input image data. In some implementations, image capture device 100 may provide each of first layer bounding box anchor 252, second layer bounding box anchor 256, and $N^{th}$ layer bounding box anchor 260 with the corresponding object ground truth data indicating whether an object does not exist within the generated bounding box. Further, in some implementations, image capture device 100 may provide each of first layer bounding box anchor 252, second layer bounding box anchor 256, and $N^{th}$ layer bounding box anchor 260 with the corresponding ground truth bounding box.

Further, in some examples, image capture device 100 may compare object data 214, class data 216, and/or bounding box data 218 to the generated object ground truth, ground truth confidence scores, and ground truth bounding boxes, respectively, to determine if neural network 200 is sufficiently trained. For example, image capture device 100 may compute one or more metrics, such as precision values, recall values, and area under curve (AUC) values, such as for receiver operating characteristic (ROC) curves or precision-recall (PR) curves. In some examples, training is complete when the one or more metrics satisfy a predetermined threshold.

In other examples, image capture device 100 applies the initially trained neural network 200 to a validation set (e.g., a validation set of images), and may determine whether the initially trained neural network 200 is sufficiently trained based on the object data 214, class data 216, and bounding box data 218 generated during the validation. For example, image capture device 100 may compute one or more metrics as described herein based on the object data 214, class data 216, and bounding box data 218 generated during the validation. If the computed metrics indicate that neural network 200 is not sufficiently trained (e.g., the one or more computed metrics do not meet their corresponding thresholds), the one or more processors execute the instructions to continue training neural network 200 (e.g., with additional training images). Once neural network 200 is sufficiently trained, image capture device 100 may store configuration parameters, hyperparameters, and/or weights associated with the trained neural network 200 within, for example, instruction memory 132.

Although, as described, image capture device 100 trains neural network 200, one or more of any suitable processing devices associated with image capture device 100 may train neural network 200 as described herein. For example, one or more servers, such as one or more cloud-based servers, may train neural network 200. In some examples, one or more processors (e.g., CPUs, GPUs) of a distributed or cloud-based computing cluster may train neural network 200. In some implementations, neural network 200 is trained by another processing device associated with image capture device 100, and the other processing device stores the configuration parameters, hyperparameters, and/or weights associated with the trained neural network 200 in a data repository over a network (e.g., the Internet). Further, image capture device 100 obtains, over the network, the stored configuration parameters, hyperparameters, and/or weights, and stores them within instruction memory 132 (e.g., within CNN model data 132*a*). Image capture device 100 may then establish neural network 200 based on the configuration parameters, hyperparameters, and/or weights stored within instruction memory 132 (CNN model data 132*a*).

Figure 4A:
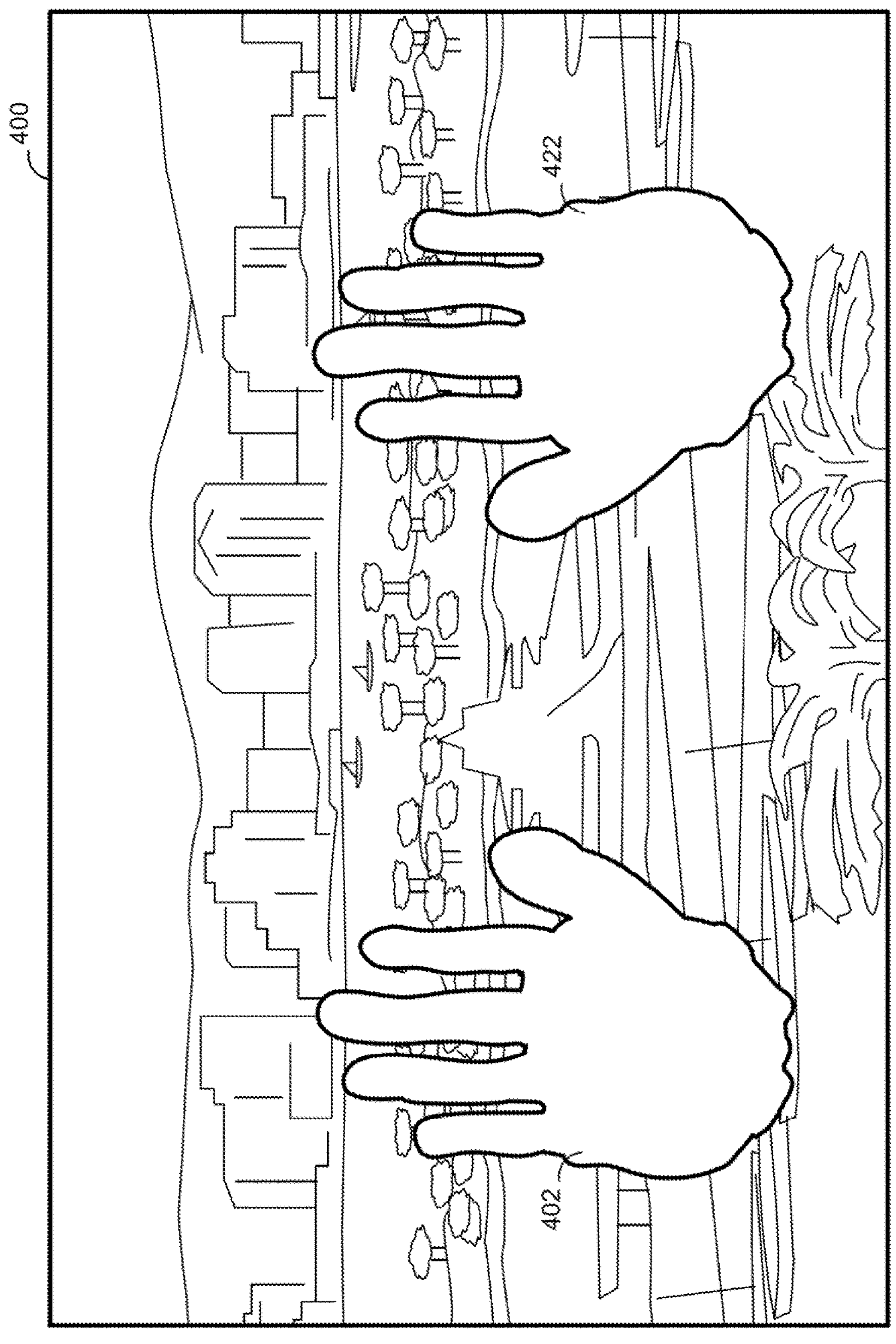
FIGS. 4A and 4B are diagrams of captured images, according to some implementations.
Figure 4B:
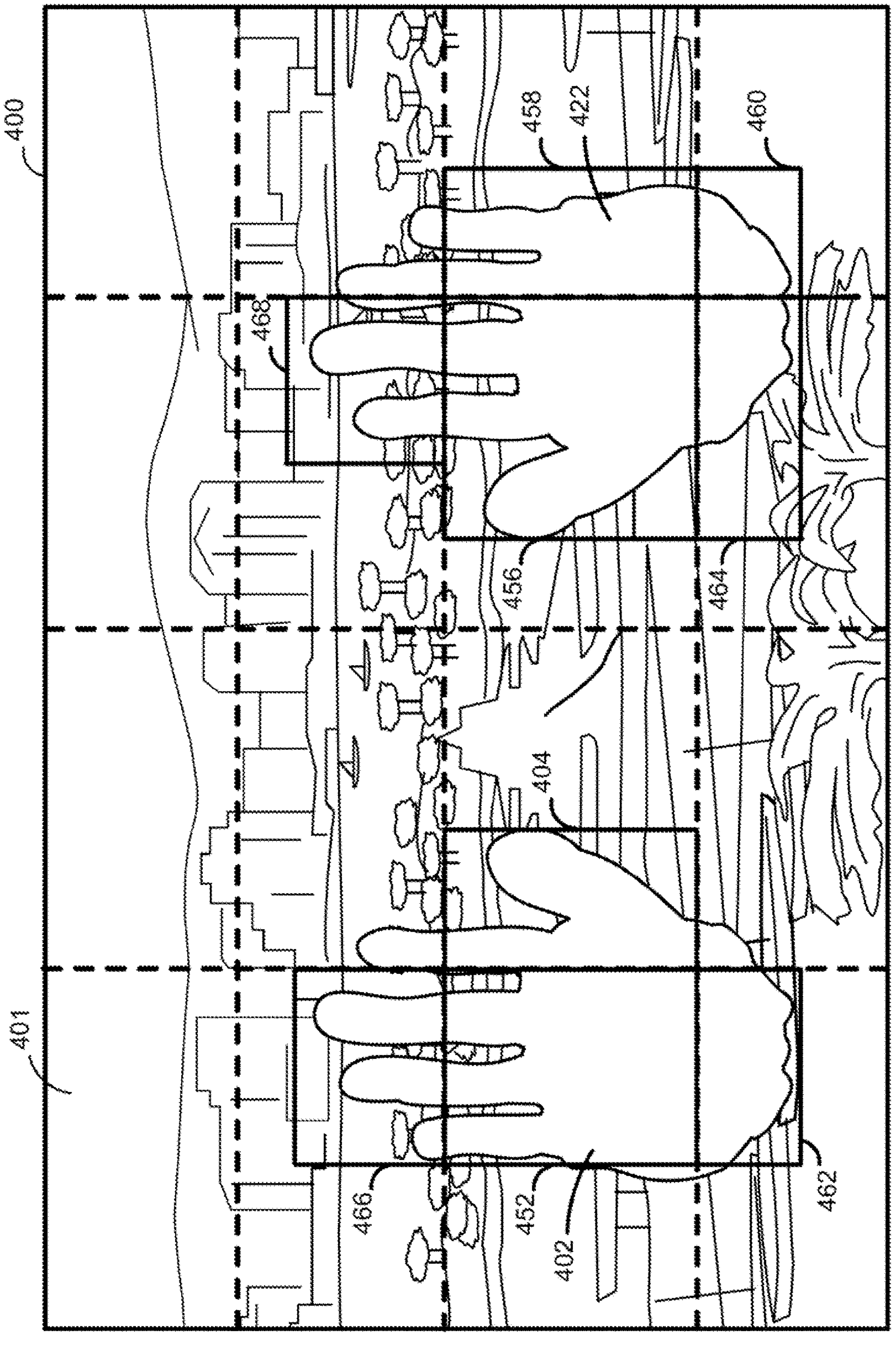

FIG. 4A illustrates an image 400 that includes, among other things, a left hand 402 and a right hand 422. Image 400 may represent an image captured by image capture device 100. Image capture device may apply a trained neural network, such as neural network 200, to detect objects within image 400. For example, and as illustrated in FIG. 4B, image capture device 100 may partition image 400 into a plurality of partitions 401 (e.g., 16 partitions in this example), and may apply one or more of the trained neural networks 200, in real-time and in sequence or, in some examples, in parallel, to each of the plurality of partitions 401. For example, and based on the application of the trained neural network 200, the image capture device 100 may generate one or more bounding boxes that may include an object. For instance, as illustrated in FIG. 4B, the image capture device 100 may generate and output one or more of bounding boxes 466, 452, 404, 462, 464, 456, 458, and 460. The bounding boxes each include portions of either left hand 402 and right hand 422. Although multiple bounding boxes include portions of each of left hand 402 and right hand 422, in some examples, an object, such as left hand 402 or right hand 422, may appear entirely within a single bounding box.

Figure 5A:
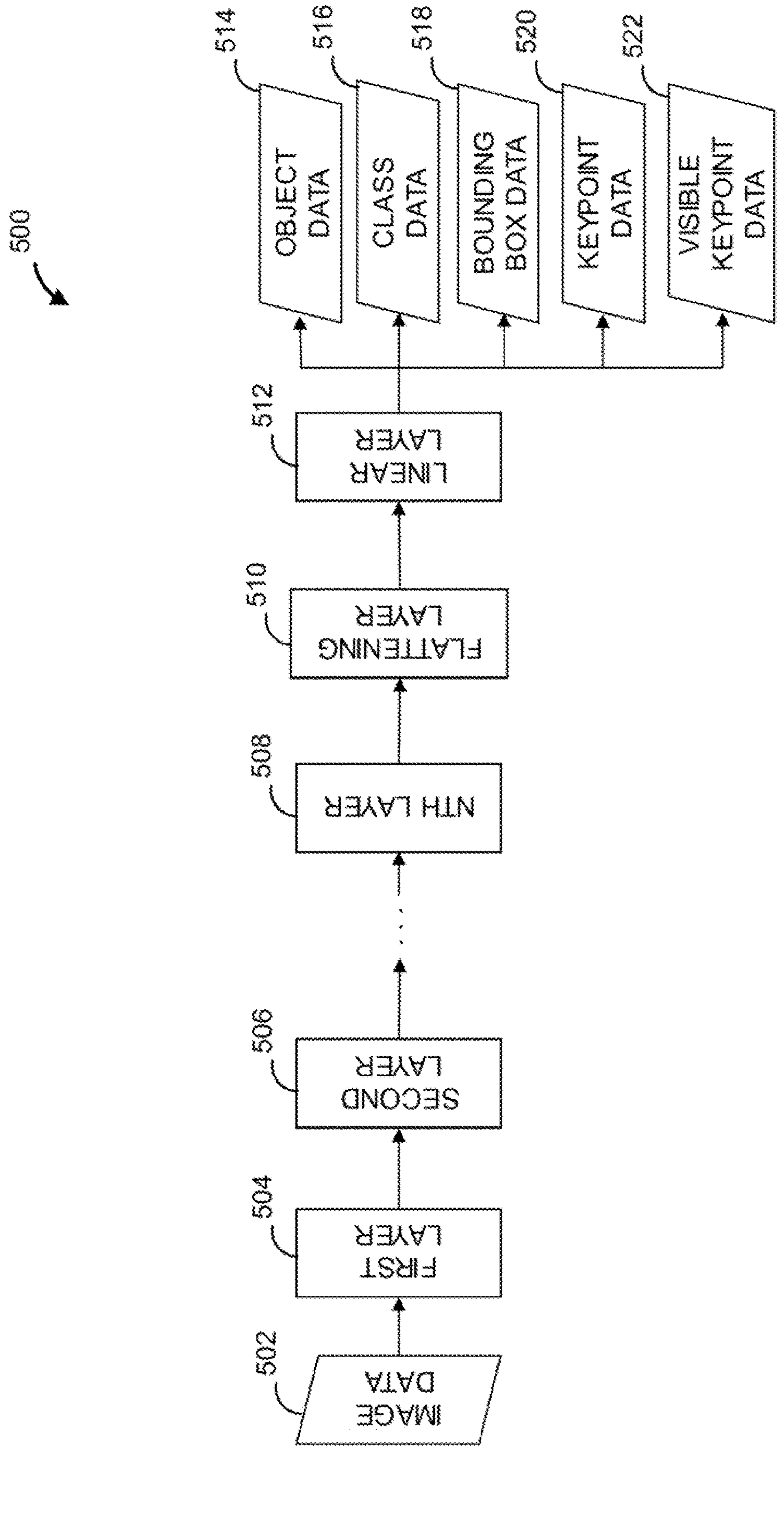
FIGS. 5A. 5B, and 6 are block diagrams of exemplary neural networks, according to some implementations.

FIG. 5A illustrates a block diagram of a neural network 500 that includes multiple convolutional layers including first layer 504, second layer 506, and $N^{th}$ layer 508, as well as a flattening layer 510 and a linear layer 512, similar to the corresponding layers of neural network 200 of FIG. 2. Further, neural network 500 receives (e.g., ingests) image data 502, which may be captured by camera 115 of image capture device 100, and may generate bounding box data 518 characterizing a bounding box, object data 514 characterizing a likelihood (e.g., probability) that the bounding box includes an object, and class data 516 characterizing a likelihood that the object is of a corresponding class (e.g., a particular class type). Neural network 500, however, is further trained to generate keypoint data 520 characterizing one or more keypoints, and visible keypoint data 522 characterizing one or more of the keypoints that are visible (e.g., within an image's visible area). The keypoints may identify locations within an image, and may be associated with an object. The keypoints may be two or three dimensional keypoints, for example. For instance, keypoint data 520 may characterize keypoints corresponding to an object within the bounding box characterized by bounding box data 518. In some examples, the flattening layer 510 provides fully connected branches for objectness, class labels, bounding boxes, keypoints, and keypoint visibilities.

Figure 5B:
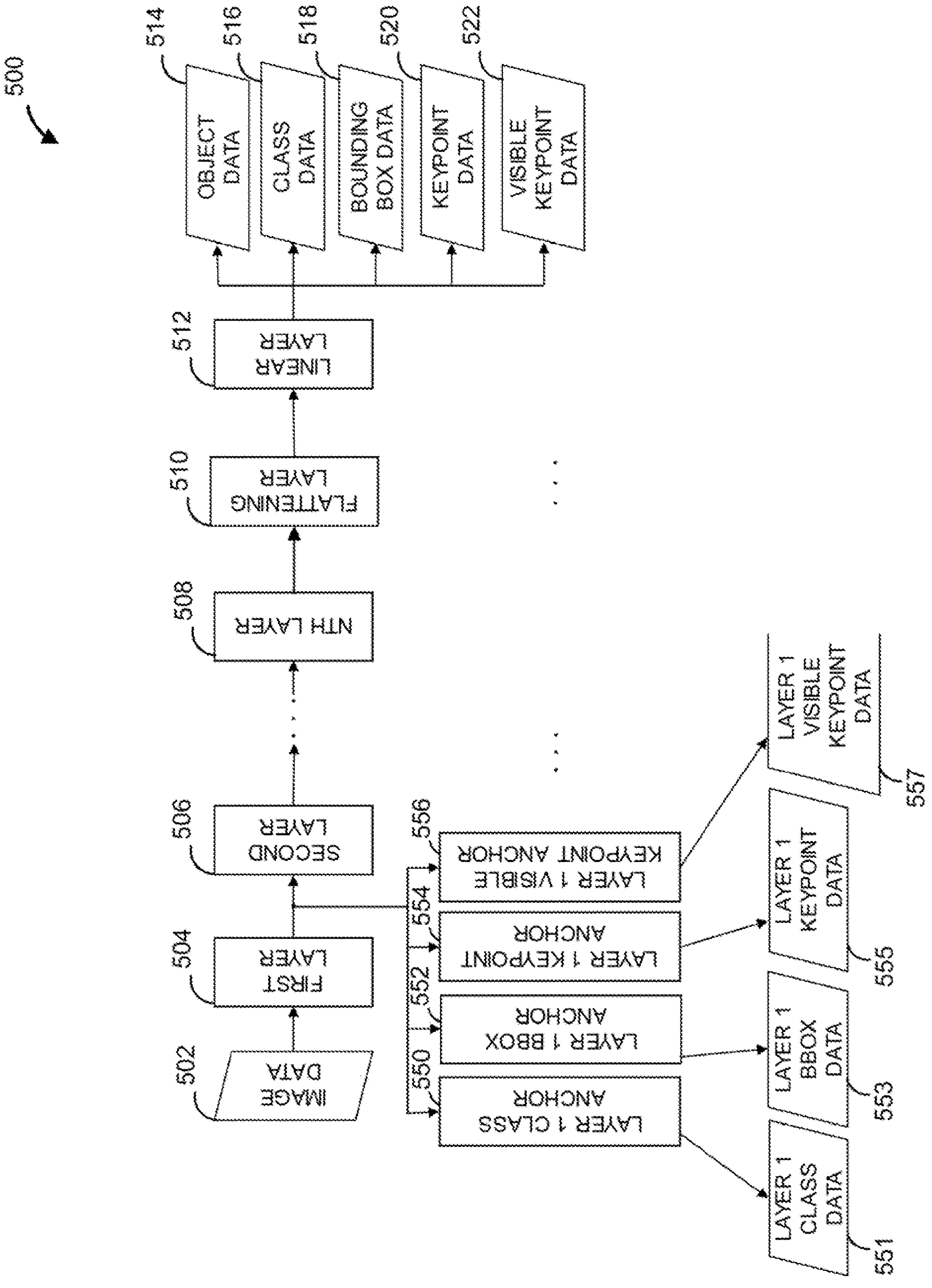

In some implementations, to train neural network 500, image capture device 100 employs additional anchors during training. For example, and with reference to FIG. 5B, image capture device 100 may employ a class anchor, a bounding box anchor, as well as a keypoint anchor and a visible keypoint anchor, that operates on the output data of each of the convolutional layers. For example, and similar to neural network 200, during training neural network 500 includes first layer class anchor 550 that operates on the output of the first layer 504 to generate first layer class data 551 that characterizes a value indicative of whether the output of the first layer 504 includes an object of a particular classification, as described herein.

Further, during training, neural network 500 includes first layer bounding box anchor 552 that operates on the output of the first layer 504 to generate first layer bounding box data 553, which characterizes a bounding box as described herein. During training, each classification anchor generates output data characterizing a prediction of whether its input data includes an object of one or more classifications, as described herein. For example, first layer class anchor 550 may operate on the output of the first layer 504 to generate first layer class data 551 characterizing a value indicative of whether the output of the first layer 504 includes an object of a particular classification. Further, each bounding box anchor generates output data characterizing a bounding box that may include an object, as described herein. For example, first layer bounding box anchor 552 may operate on the output of the first layer 504 to generate first layer bounding box data 553 characterizing a bounding box that may include an object.

Neural network 500, however, further includes first layer keypoint anchor 554 and first layer visible keypoint anchor 556. First layer keypoint anchor 554 operates on the output of the first layer 504 to generate first layer keypoint data 555, which characterizes any keypoints associated with an object (e.g., an object included within the bounding box characterized by first layer bounding box data 553). First layer visible keypoint anchor 556 operates on the output of the first layer 504 to generate first layer visible keypoint data 557, which characterizes any visible keypoints associated with an object. Similarly, during training, neural network 500 includes a layer class anchor, a layer bounding box anchor, a layer keypoint anchor, and a layer visible keypoint anchor that operate on layer output data for each additional layer (not illustrated for simplicity).

In some implementations, each class anchor, bounding box anchor, keypoint anchor, and visible keypoint anchor applies a corresponding weight (e.g., a scaling factor) to generate class data, bounding box data, keypoint data, and visible keypoint data, such as first layer class data 551, first layer bounding box data 553, first layer keypoint data 555, and first layer visible keypoint data 557. The weights may differ, and may be predefined and stored in instruction memory 132, for example. For instance, a user may configure the weights using user interface 132, and CPU 116 may store the weights within instruction memory 132. Image capture device 100 may obtain the configured weights from instruction memory 132, and may configure each of the class anchors, bounding box anchors, keypoint anchors, and visible keypoint anchors (e.g., first layer class anchor 550, first layer bounding box anchor 552, first layer keypoint anchor 554, and first layer visible keypoint anchor 556) with their corresponding weight.

Further, in some implementations, image capture device 100 computes one or more metrics based on comparing one or more of the keypoints characterized by first layer keypoint data 555 and/or first layer visible keypoint data 557 with ground truth keypoints, and may determine that training of the neural network 500 is complete when the one or more metrics satisfy predetermined thresholds, as described herein. For example, image capture device 100 may determine a distance from each keypoint identified by first layer keypoint data 555 and/or first layer visible keypoint data 557 to one or more ground truth keypoints (e.g., a distance in the X and Y directions, a Cartesian distance), and compare the computed distances to determine if the distances are within one or more predetermined distance thresholds. Image capture device 100 may determine that neural network 500 is sufficiently trained when the computed distances are within the predetermined thresholds, and may store configuration parameters, hyperparameters, and/or weights associated with the trained neural network 500 within, for example, instruction memory 132.

Although, as described, image capture device 100 trains neural network 500, one or more of any suitable processing devices associated with image capture device 100 may train neural network 500 as described herein. For example, one or more servers, such as one or more cloud-based servers, may train neural network 500. In some examples, one or more processors (e.g., CPUs, GPUs) of a distributed or cloud-based computing cluster may train neural network 500. In some implementations, neural network 500 is trained by another processing device associated with image capture device 100, and the other processing device stores the configuration parameters, hyperparameters, and/or weights associated with the trained neural network 500 in a data repository over a network (e.g., the Internet). Further, image capture device 100 obtains, over the network, the stored configuration parameters, hyperparameters, and/or weights, and stores them within instruction memory 132 (e.g., within CNN model data 132*a*). Image capture device 100 may then establish neural network 500 based on the configuration parameters, hyperparameters, and/or weights stored within instruction memory 132 (CNN model data 132*a*).

Figure 6:
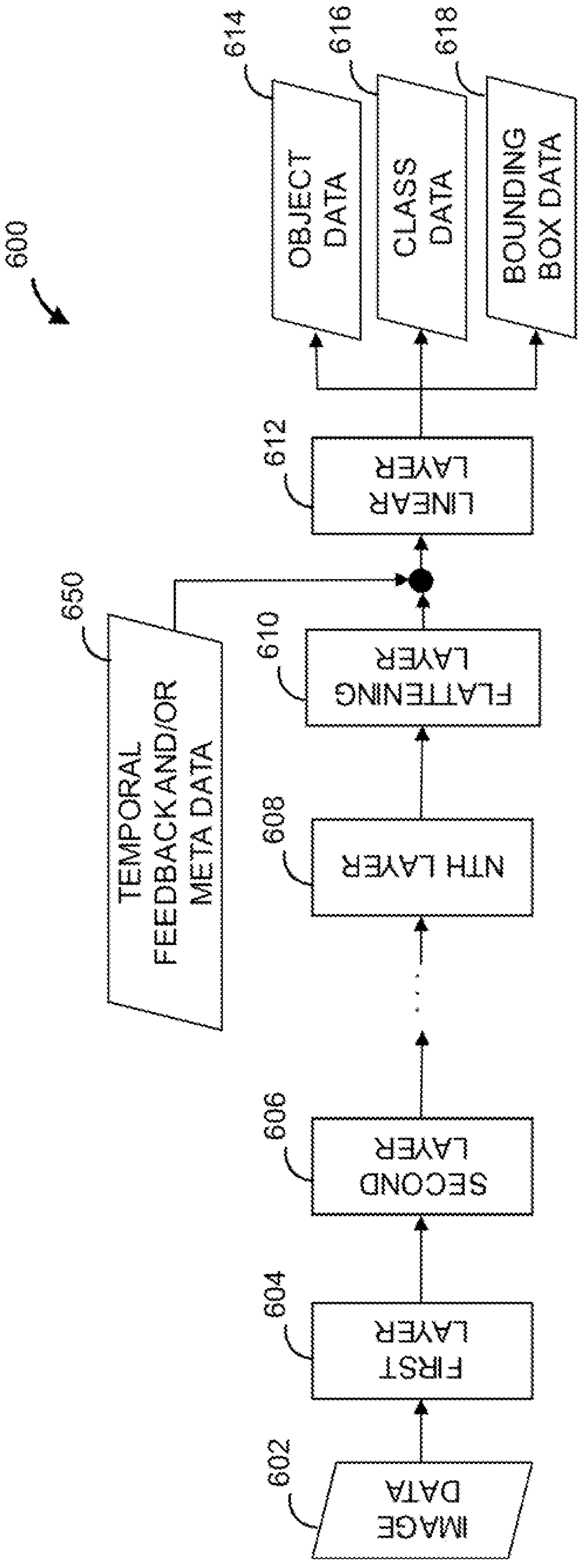

FIG. 6 illustrates a block diagram of a neural network 600 that includes multiple convolutional layers including first layer 604, second layer 606, and $N^{th}$ layer 608, as well as a flattening layer 610 and a linear layer 612, similar to the corresponding layers of neural network 200 of FIG. 2. In this example, however, in addition to the feature vector generated by flattening layer 610, the linear layer 612 may also receive and operate on temporal feedback and/or meta data 650, which may be stored within instruction memory 132, for example. Temporal data may include, for example, bounding box data 618 generated from previous image frames (e.g., image frames previously processed). Temporal data may also include, for example, class confidence scores generated for the previous frames. In some examples, the number of previous frames may be configured by a user (e.g., via user interface 122) and stored within instruction memory 132.

Meta data may include, for example, values of camera parameters (e.g., camera parameters associated with camera 115) and/or distortion data. As an example, for egocentric hand detection and keypoint estimation processes, meta data may include values characterizing bone length and skin color information of a user determined from prior image frames.

The neural network 600 may append the feature vector generated by the flattening layer 610 with additional features generated from temporal feedback and/or meta data 650, and provide the appended feature vector to the linear layer 612 for generating the fully-connected layer that provides the object data 614, the class data 616, and the bounding box data 618.

Figure 7:
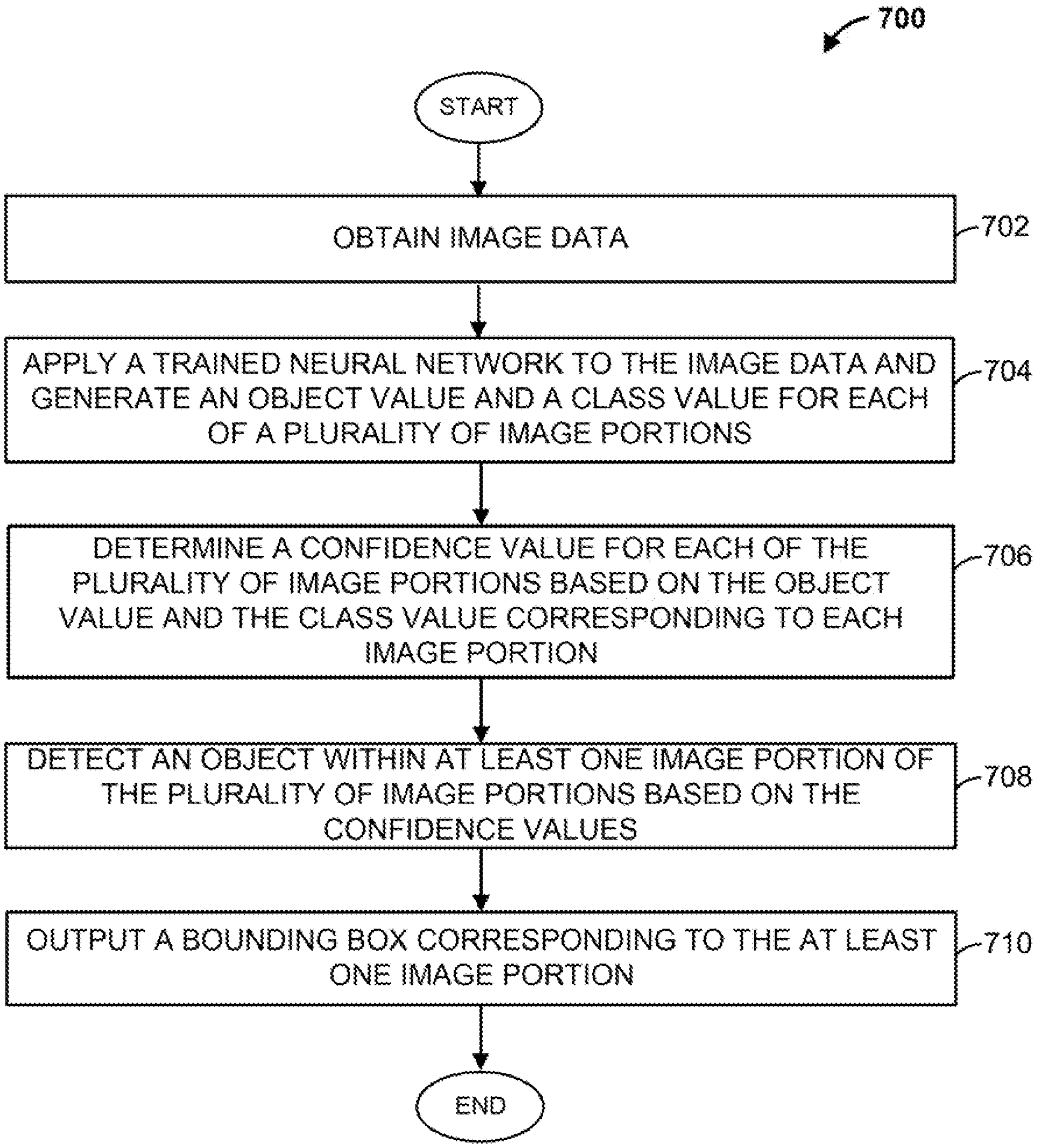
FIG. 7 is a flowchart of exemplary processes for applying a trained neural network to image data to generate a bounding box, according to some implementations.

FIG. 7 is a flowchart of an example process 700 for applying a trained neural network to image data to generate a bounding box, in accordance with one implementation. Process 700 may be performed by one or more processors executing instructions locally at an image capture device, such as by one or more of camera processor 114, CPU 116, and GPU 118 of image capture device 100 of FIG. 1. Accordingly, the various operations of process 700 may be represented by executable instructions held in storage media of one or more computing platforms, such as instruction memory 132 of image capture device 100.

At block 702, image capture device 100 may obtain image data. For example, image capture device 100 may capture an image via camera 115, and may store the captured image within, for example, system memory 130. In some instances, image capture device 100 may obtain image data previously stored within system memory 130.

At block 704, the image capture device 100 executes a trained neural network to ingest the image data, and based on an application of the trained neural network to the image data, generates an object value and a class value for each of a plurality of image portions. For example, image capture device 100 may obtain at least portions of CNN model data 132*a*, which characterize a neural network such as one or more of neural networks 200, 500, 600, from instruction memory 132. Further, image capture device 100 may execute the obtained portions to establish the neural network, and the established neural network ingests each of a plurality of image portions of the image captured by camera 115. In some examples, image capture device 100 executes one or more neural networks simultaneously to differing portions of the image data. Based on the execution of the neural network, the image capture device may generate object data, such as object data 214, 514, 614, and class data, such as class data 216, 516, 616. As described herein, the object data may include an object value that characterizes a likelihood that the image data includes an object, and the class data may include a classification value that characterizes a likelihood that the object is of a particular classification.

Further, and at block 706, the image capture device 100 determines a confidence value for each of the plurality of image portions based on the object value and the class value corresponding to each image portion. For example, and for each image portion, the image capture device 100 may generate a class confidence score based on the generated object value and class value corresponding to each image portion. For instance, the image capture device 100 may multiply the object value and the class value to generate the class confidence score.

Proceeding to block 708, the image capture device 100 may detect an object within at least one image portion of the plurality of image portions based on the confidence values. For example, and as described herein, the image capture device 100 may compare each class confidence score to a threshold, and may determine an object is within an image portion when the corresponding class confidence score exceeds the threshold. Otherwise, if the corresponding class confidence score does not exceed the threshold, the image capture device 100 may determine that no object is within the image portion.

At block 710, the image capture device 100 outputs a bounding box that corresponds to the at least one image portion. For example, and as described herein, the image capture device 100 may output bounding box data, such as bounding box data 218, 518, 618, which characterizes a bounding box associated with the computed object value and class value.

Figure 8:
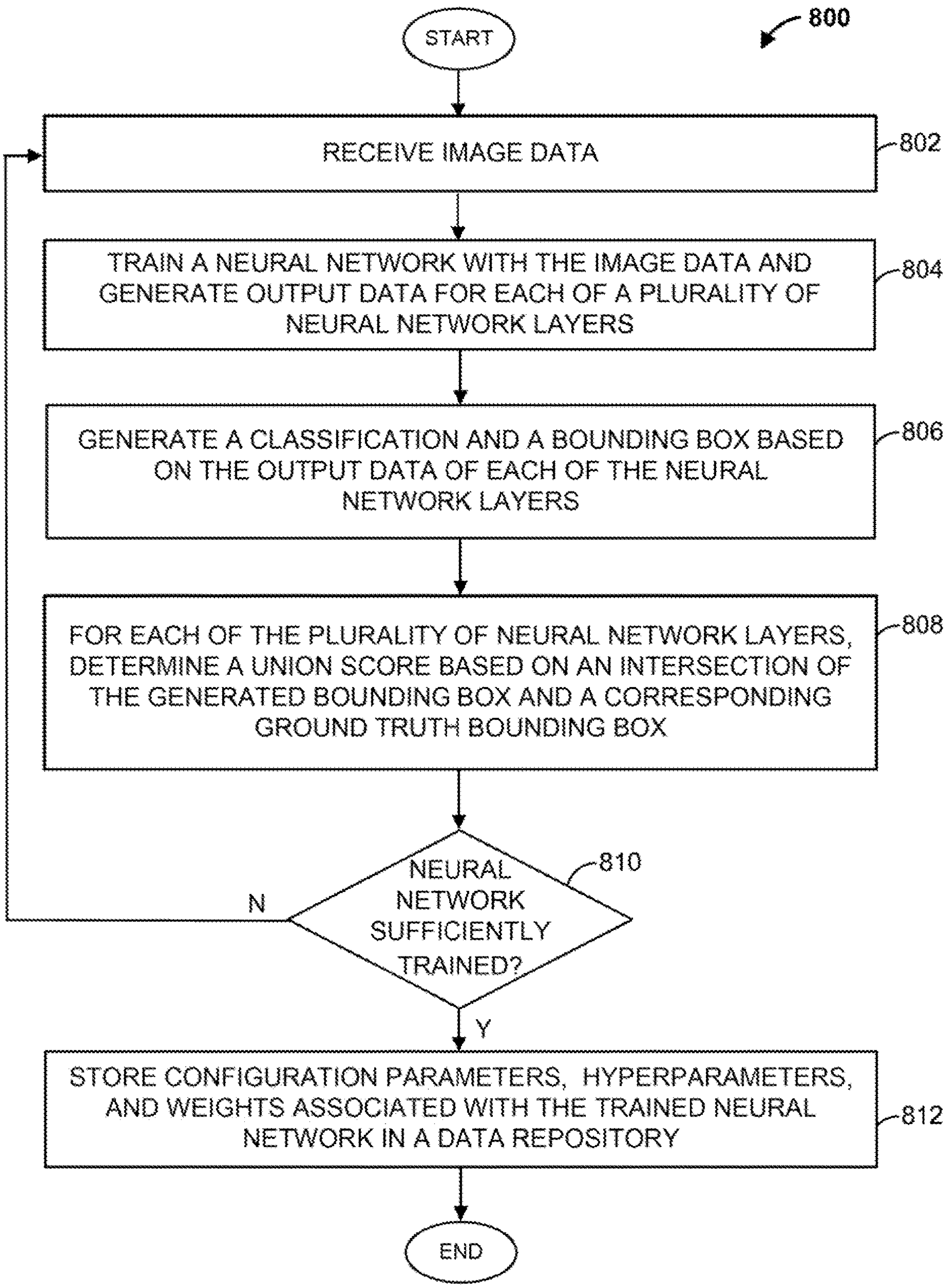
FIG. 8 is a flowchart of an exemplary process for training a neural network, according to some implementations.

FIG. 8 is a flowchart of an example process 800 for training a neural network, in accordance with one implementation. Process 800 may be performed by one or more processors executing instructions locally at an image capture device, such as by one or more of camera processor 114, CPU 116, and GPU 118 of image capture device 100 of FIG. 1. Accordingly, the various operations of process 800 may be represented by executable instructions held in storage media of one or more computing platforms, such as instruction memory 132 of image capture device 100.

At block 802, the image capture device 100 obtains image data. For example, the image capture device 100 may obtain, from system memory 130, image data characterizing a training set of images. At least a portion of the training set of images may include one or more objects. The images may include objects that vary, and may include images of the same or similar objects from various views (e.g., such as images of the same or similar hands in various poses).

At block 804, the image capture device 100 trains a neural network with the image data, and generates output data for each of a plurality of neural network layers. For example, the image capture device 100 may execute a neural network, such as neural network 200 or neural network 500, that includes multiple convolutional layers, such as first layer 204, 504, second layer 206, 506, $N^{th}$ layer 208, 508. Each of the convolutional layers generate output data and, in some examples, each subsequent convolutional layer operates on input data that is pooled and, as such, down sampled from input data provided to a previous convolutional layer.

Further, at block 806, the image capture device 100 generates a classification and a bounding box based on the output data of each of the neural network layers. For example, the neural network may include class anchors (e.g., first layer class anchor 250, second layer class anchor 254, $N^{th}$ layer class anchor 258) and bounding box anchors (e.g., first layer bounding box anchor 252, second layer bounding box anchor 256, $N^{th}$ layer bounding box anchor 260) that operate on the output data of corresponding convolutional layers (e.g., the output data from first layer 204, 504, second layer 206, 506, $N^{th}$ layer 208, 508). Each class anchor, as described herein, may provide a classification (e.g., as characterized by first layer class data 251, second layer class data 255, $N^{th}$ layer class data 259), and a corresponding bounding box (e.g., as characterized by first layer bounding box data 253, second layer bounding box data 257, $N^{th}$ layer bounding box data 261).

At block 808, the image capture device 100 determines, for each of the plurality of neural network layers, a union score based on an intersection of the generated bounding box and a corresponding ground truth bounding box. For example, the image capture device 100 may obtain, from system memory 130, ground truth data characterizing ground truth bounding boxes that correspond to the generated bounding boxes. Further, the image capture device 100 may compute the union score as an IOU ratio based on the generated bounding boxes and the obtained, and corresponding, ground truth bounding boxes. As described herein, the IOU ratio may be computed as a percentage of a generated bounding box that intersects (e.g., is coincident with) a corresponding ground truth bounding box.

Proceeding to block 810, the image capture device 100 determines whether the neural network is sufficiently trained. For example, the image capture device 100 may generate a training score based on the union scores. For instance, the image capture device 100 may add the union scores to compute the training score. In other examples, the image capture device 100 may combine the union scores in any suitable manner to generate the training score. Further, the image capture device 100 may compare the training score to a predetermined threshold where, if the training score exceeds the predetermined threshold, the neural network is sufficiently trained.

In other examples, the image capture device 100 may compute one or more alternate metrics, such as precision values, recall values, and area under curve (AUC) values, such as for receiver operating characteristic (ROC) curves or precision-recall (PR) curves, and may determine if the neural network is sufficiently trained based on the computed metrics, as described herein. Further, and in some examples, the image capture device 100 may apply an initially trained neural network to a validation set of images to determine whether the initially trained neural network is sufficiently trained. For example, the image capture device 100 may compute one or more metrics, and determine whether the initially trained neural network is sufficiently trained based on the computed metrics, as described herein.

If the image capture device 100 determines that the neural network is not yet sufficiently trained, the method proceeds back to block 802, where additional image data is received. Otherwise, if the image capture device 100 determines that the neural network is sufficiently trained, the method proceeds to block 812. At block 812, the image capture device 100 stores one or more of any of configuration parameters, hyperparameters, and weights associated with the trained neural network in a data repository. For example, the image capture device 100 may store one or more of any of configuration parameters, hyperparameters, and weights associated with the trained neural network (e.g., neural network 200, 500) within CNN model data 132*a* of instruction memory 132.

Implementation examples are further described in the following numbered clauses:

1. An image capture device comprising:

a non-transitory, machine-readable storage medium storing instructions; and at least one processor coupled to the non-transitory, machine-readable storage medium, the at least one processor being configured to execute the instructions to:

obtain image data from a camera of the image capture device;

apply a trained machine learning process to the image data to generate an object value and a class value for each of a plurality of image portions of the image data;

determine, for each of the plurality of image portions, a confidence value based on the object value and the class value corresponding to each image portion; and detect an object within at least one image portion of the plurality of image portions based on the confidence values.

2. The image capture device of clause 1, wherein the at least one processor is further configured to execute the instructions to:

output a bounding box corresponding to the at least one image portion of the plurality of image portions.

3. The image capture device of clause 2, wherein the at least one processor is further configured to execute the instructions to:

perform at least one of automatic focus, automatic gain, automatic exposure, and automatic white balance based on the bounding box.

4. The image capture device of any of clauses 1-3, wherein detecting the object within the at least one image portion of the plurality of image portions based on the confidence values comprises:

comparing at least one of the confidence values to a threshold; and determining the object is within the at least one image portion based on the at least one comparison.

5. The image capture device of any of clause 1-4, wherein the trained machine learning process comprises establishing a neural network.

6. The image capture device of clause 5, wherein the neural network comprises a plurality of convolutional layers, a flattening layer, and a linear layer configured to generate at least one fully connected layer that provides the object value and the class value.

7. The image capture device of any of clause 1-6, wherein the at least one processor is further configured to execute the instructions to:

obtain temporal data characterizing at least one previously generated confidence value; and apply the trained machine learning process to the temporal data to generate the object value and the class value.

8. The image capture device of clause 7, wherein the temporal data further characterizes at least one previously generated bounding box.

9. The image capture device of any of clause 1-8, wherein the at least one processor is further configured to execute the instructions to:

apply the trained machine learning process to the image data to generate a keypoint value for each of the plurality of image portions of the image data; and output the keypoint value for each of the plurality of image portions of the image data.

10. The image capture device of any of clauses 1-9, wherein the at least one processor is further configured to execute the instructions to:

apply the trained machine learning process to the image data to generate a visible keypoint value for each of the plurality of image portions of the image data;

and output the visible keypoint value for each of the plurality of image portions of the image data.

11. The image capture device of any of clause 1-10, wherein the at least one processor is further configured to execute the instructions to:

obtain a training set of images;

train the machine learning process based on the training set of images;

generate a second bounding box based on the training;

determine a union value based on an intersection of the second bounding box and a corresponding ground truth bounding box; and determine whether the machine learning process is trained based on the union value.

12. The image capture device of clause 11, wherein generating the second bounding box comprises generating a plurality of bounding boxes, each of the plurality of bounding boxes generated based on output data of a layer of the machine learning process.

13. The image capture device of any of clause 11-12, wherein determining the union value comprises determining an intersection over union (IOU) ratio.

14. The image capture device of any of clause 11-13, wherein the at least one processor is further configured to execute the instructions to:

generate object ground truth data corresponding to the object value based on the union value; and train the machine learning process based on the object ground truth data.

15. The image capture device of any of clauses 11-14, wherein the at least one processor is further configured to execute the instructions to:

determine that the machine learning process is trained; and store one or more hyperparameters associated with the trained machine learning process in a memory device.

16. The image capture device of any of clause 1-15, wherein the at least one processor is further configured to execute the instructions to:

establish a classification anchor and a bounding box anchor at each of a plurality of layers of the machine learning process, wherein each classification anchor generates classification data and each bounding box anchor generates bounding box data;

train the machine learning process based on a training set of images; and generate, during the training, the classification data and the bounding box data.

17. A method for detecting an object within a captured image, comprising:

obtaining image data from a camera of an image capture device;

applying a trained machine learning process to the image data to generate an object value and a class value for each of a plurality of image portions of the image;

determining, for each of the plurality of image portions, a confidence value based on the object value and the class value corresponding to each image portion; and detecting the object within at least one image portion of the plurality of image portions based on the confidence values.

18. The method of clause 17, further comprising:

outputting a bounding box corresponding to the at least one image portion of the plurality of image portions.

19. The method of clause 18, further comprising:

performing at least one of automatic focus, automatic gain, automatic exposure, and automatic white balance based on the bounding box.

20. The method of any of clauses 17-19, wherein detecting the object within the at least one image portion of the plurality of image portions based on the confidence values comprises:

comparing at least one of the confidence values to a threshold; and determining the object is within the at least one image portion based on the at least one comparison.

21. The method of any of clauses 17-20, wherein the trained machine learning process comprises establishing a neural network.

22. The method of clause 21, wherein the neural network comprises a plurality of convolutional layers, a flattening layer, and a linear layer configured to generate at least one fully connected layer that provides the object value and the class value.

23. The method of any of clauses 17-22, further comprising:

obtaining temporal data characterizing at least one previously generated confidence value; and applying the trained machine learning process to the temporal data to generate the object value and the class value.

24. The method of clause 23, wherein the temporal data further characterizes at least one previously generated bounding box.

25. The method of any of clauses 17-24, further comprising:

applying the trained machine learning process to the image data to generate a keypoint value for each of the plurality of image portions of the image data; and outputting the keypoint value for each of the plurality of image portions of the image data.

26. The method of any of clauses 17-25, further comprising:

apply the trained machine learning process to the image data to generate a visible keypoint value for each of the plurality of image portions of the image data; and output the visible keypoint value for each of the plurality of image portions of the image data.

27. The method of any of clauses 17-26, further comprising:

obtaining a training set of images;

training the machine learning process based on the training set of images;

generating a second bounding box based on the training;

determining a union value based on an intersection of the second bounding box and a corresponding ground truth bounding box; and determining whether the machine learning process is trained based on the union value.

28. The method of clause 27, wherein generating the second bounding box comprises generating a plurality of bounding boxes, each of the plurality of bounding boxes generated based on output data of a layer of the machine learning process.

29. The method of any of clauses 27-28, wherein determining the union value comprises determining an intersection over union (IOU) ratio.

30. The method of any of clauses 27-29, further comprising:

generating object ground truth data corresponding to the object value based on the union value; and training the machine learning process based on the object ground truth data.

31. The method of any of clauses 27-30, further comprising:

determining that the machine learning process is trained; and storing one or more hyperparameters associated with the trained machine learning process in a memory device.

32. The method of any of clauses 17-31, further comprising:

establishing a classification anchor and a bounding box anchor at each of a plurality of layers of the machine learning process, wherein each classification anchor generates classification data and each bounding box anchor generates bounding box data;

training the machine learning process based on a training set of images; and generating, during the training, the classification data and the bounding box data.

33. A non-transitory, machine-readable storage medium storing instructions that, when executed by at least one processor, cause the at least one processor to perform operations that include:

obtaining image data from a camera of an image capture device;

applying a trained machine learning process to the image data to generate an object value and a class value for each of a plurality of image portions of the image;

determining, for each of the plurality of image portions, a confidence value based on the object value and the class value corresponding to each image portion; and detecting an object within at least one image portion of the plurality of image portions based on the confidence values.

34. The non-transitory, machine-readable storage medium of clause 33, wherein the instructions, when executed by the at least one processor, cause the at least one processor to perform further operations that include:

outputting a bounding box corresponding to the at least one image portion of the plurality of image portions.

35. The non-transitory, machine-readable storage medium of clause 34, wherein the instructions, when executed by the at least one processor, cause the at least one processor to perform further operations that include:

performing at least one of automatic focus, automatic gain, automatic exposure, and automatic white balance based on the bounding box.

36. The non-transitory, machine-readable storage medium any of clauses 33-35, wherein detecting the object within the at least one image portion of the plurality of image portions based on the confidence values comprises:

comparing at least one of the confidence values to a threshold; and determining the object is within the at least one image portion based on the at least one comparison.

37. The non-transitory, machine-readable storage medium of any of clauses 33-36, wherein the trained machine learning process comprises establishing a neural network.

38. The non-transitory, machine-readable storage medium of clause 37, wherein the neural network comprises a plurality of convolutional layers, a flattening layer, and a linear layer configured to generate at least one fully connected layer that provides the object value and the class value.

39. The non-transitory, machine-readable storage medium of clauses 33-38, wherein the instructions, when executed by the at least one processor, cause the at least one processor to perform further operations that include:

obtaining temporal data characterizing at least one previously generated confidence value; and applying the trained machine learning process to the temporal data to generate the object value and the class value.

40. The non-transitory, machine-readable storage medium of clause 39, wherein the temporal data further characterizes at least one previously generated bounding box.

41. The non-transitory, machine-readable storage medium of clauses 33-40, wherein the instructions, when executed by the at least one processor, causes the at least one processor to perform further operations that include:

applying the trained machine learning process to the image data to generate a keypoint value for each of the plurality of image portions of the image data; and outputting the keypoint value for each of the plurality of image portions of the image data.

42. The non-transitory, machine-readable storage medium of clauses 33-41, wherein the instructions, when executed by the at least one processor, causes the at least one processor to perform further operations that include:

applying the trained machine learning process to the image data to generate a visible keypoint value for each of the plurality of image portions of the image data; and outputting the visible keypoint value for each of the plurality of image portions of the image data.

43. The non-transitory, machine-readable storage medium of any of clauses 33-42, wherein the instructions, when executed by the at least one processor, causes the at least one processor to perform further operations that include:

obtaining a training set of images;

training the machine learning process based on the training set of images;

generating a second bounding box based on the training;

determining a union value based on an intersection of the second bounding box and a corresponding ground truth bounding box; and determining whether the machine learning process is trained based on the union value.

44. The non-transitory, machine-readable storage medium of clause 43, wherein generating the second bounding box comprises generating a plurality of bounding boxes, each of the plurality of bounding boxes generated based on output data of a layer of the machine learning process.

45. The non-transitory, machine-readable storage medium of any of clauses 43-44, wherein determining the union value comprises determining an intersection over union (IOU) ratio.

46. The non-transitory, machine-readable storage medium of any of clauses 43-45, wherein the instructions, when executed by the at least one processor, causes the at least one processor to perform further operations that include:

generating object ground truth data corresponding to the object value based on the union value; and training the machine learning process based on the object ground truth data.

47. The non-transitory, machine-readable storage medium of any of clauses 43-46, wherein the instructions, when executed by the at least one processor, causes the at least one processor to perform further operations that include:

determining that the machine learning process is trained; and storing one or more hyperparameters associated with the trained machine learning process in a memory device.

48. The non-transitory, machine-readable storage medium of any of clauses 33-47, wherein the instructions, when executed by the at least one processor, causes the at least one processor to perform further operations that include:

establishing a classification anchor and a bounding box anchor at each of a plurality of layers of the machine learning process, wherein each classification anchor generates classification data and each bounding box anchor generates bounding box data;

training the machine learning process based on a training set of images; and generating, during the training, the classification data and the bounding box data.

49. An image capture device comprising:

a means for obtaining image data from a camera of an image capture device;

a means for applying a trained machine learning process to the image data to generate an object value and a class value for each of a plurality of image portions of the image;

a means for determining, for each of the plurality of image portions, a confidence value based on the object value and the class value corresponding to each image portion; and a means for detecting an object within at least one image portion of the plurality of image portions based on the confidence values.

50. The image capture device of clause 49, further comprising:

a means for outputting a bounding box corresponding to the at least one image portion of the plurality of image portions.

51. The image capture device of clause 50, further comprising:

a means for perform at least one of automatic focus, automatic gain, automatic exposure, and automatic white balance based on the bounding box.

52. The image capture device of any of clauses 49-51, wherein the means for detecting the object within the at least one image portion of the plurality of image portions based on the confidence values comprises:

a means for comparing at least one of the confidence values to a threshold; and a means for determining the object is within the at least one image portion based on the at least one comparison.

53. The image capture device of any of clauses 49-52, wherein the trained machine learning process comprises establishing a neural network.

54. The image capture device of clause 53, wherein the neural network comprises a plurality of convolutional layers, a flattening layer, and a linear layer configured to generate at least one fully connected layer that provides the object value and the class value.

55. The image capture device of any of clauses 49-54, further comprising:

a means for obtaining temporal data characterizing at least one previously generated confidence value; and a means for applying the trained machine learning process to the temporal data to generate the object value and the class value.

56. The image capture device of clause 55, wherein the temporal data further characterizes at least one previously generated bounding box.

57. The image capture device of any of clauses 49-56, further comprising:

a means for applying the trained machine learning process to the image data to generate a keypoint value for each of the plurality of image portions of the image data; and a means for outputting the keypoint value for each of the plurality of image portions of the image data.

58. The image capture device of any of clauses 49-57, further comprising:

a means for applying the trained machine learning process to the image data to generate a visible keypoint value for each of the plurality of image portions of the image data; and a means for outputting the visible keypoint value for each of the plurality of image portions of the image data.

59. The image capture device of any of clauses 49-58, further comprising:

a means for obtaining a training set of images;

a means for training the machine learning process based on the training set of images;

a means for generating a second bounding box based on the training;

a means for determining a union value based on an intersection of the second bounding box and a corresponding ground truth bounding box; and a means for determining whether the machine learning process is trained based on the union value.

60. The image capture device of clause 59, wherein the means for generating the second bounding box comprises a means for generating a plurality of bounding boxes, each of the plurality of bounding boxes generated based on output data of a layer of the machine learning process.

61. The image capture device of any of clauses 59-60, wherein the means for determining the union value comprises a means for determining an intersection over union (IOU) ratio.

62. The image capture device of any of clauses 59-61, further comprising:

a means for generating object ground truth data corresponding to the object value based on the union value; and a means for training the machine learning process based on the object ground truth data.

63. The image capture device of any of clauses 59-62, further comprising:

a means for determining that the machine learning process is trained; and a means for storing one or more hyperparameters associated with the trained machine learning process in a memory device.

64. The image capture device of any of clauses 59-63, further comprising:

a means for establishing a classification anchor and a bounding box anchor at each of a plurality of layers of the machine learning process, wherein each classification anchor generates classification data and each bounding box anchor generates bounding box data;

a means for training the machine learning process based on a training set of images; and a means for generating, during the training, the classification data and the bounding box data.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the methods may be embodied in hardware, in executable instructions executed by a processor (e.g., software), or a combination of the two. The media may include, for example, RAMS, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, computer program code segments configure the processor to create specific logic circuits. The methods may alternatively be at least partially embodied in application specific integrated circuits for performing the methods.

We claim:

1. An image capture device comprising:

a non-transitory, machine-readable storage medium storing instructions; and at least one processor coupled to the non-transitory, machine-readable storage medium, the at least one processor being configured to execute the instructions to:

obtain image data from a camera of the image capture device;

apply a trained machine learning process to the image data to generate an object value and a class value for each of a plurality of image portions of the image data;

determine, for each of the plurality of image portions, a confidence value based on the object value and the class value corresponding to each image portion; and detect an object within at least one image portion of the plurality of image portions based on the confidence values.

2. The image capture device of claim 1, wherein the at least one processor is further configured to execute the instructions to:

output a bounding box corresponding to the at least one image portion of the plurality of image portions.

3. The image capture device of claim 2, wherein the at least one processor is further configured to execute the instructions to:

perform at least one of automatic focus, automatic gain, automatic exposure, and automatic white balance based on the bounding box.

4. The image capture device of claim 1, wherein detecting the object within the at least one image portion of the plurality of image portions based on the confidence values comprises:

comparing at least one of the confidence values to a threshold; and determining the object is within the at least one image portion based on the at least one comparison.

5. The image capture device of claim 1, wherein the trained machine learning process comprises establishing a neural network.

6. The image capture device of claim 5, wherein the neural network comprises a plurality of convolutional layers, a flattening layer, and a linear layer configured to generate at least one fully connected layer that provides the object value and the class value.

7. The image capture device of claim 1, wherein the at least one processor is further configured to execute the instructions to:

obtain temporal data characterizing at least one previously generated confidence value; and apply the trained machine learning process to the temporal data to generate the object value and the class value.

8. The image capture device of claim 7, wherein the temporal data further characterizes at least one previously generated bounding box.

9. The image capture device of claim 1, wherein the at least one processor is further configured to execute the instructions to:

apply the trained machine learning process to the image data to generate a keypoint value for each of the plurality of image portions of the image data; and output the keypoint value for each of the plurality of image portions of the image data.

10. The image capture device of claim 1, wherein the at least one processor is further configured to execute the instructions to:

apply the trained machine learning process to the image data to generate a visible keypoint value for each of the plurality of image portions of the image data; and output the visible keypoint value for each of the plurality of image portions of the image data.

11. A method for detecting an object within a captured image, comprising:

obtaining image data from a camera of an image capture device;

applying a trained machine learning process to the image data to generate an object value and a class value for each of a plurality of image portions of the image;

determining, for each of the plurality of image portions, a confidence value based on the object value and the class value corresponding to each image portion; and detecting the object within at least one image portion of the plurality of image portions based on the confidence values.

12. The method of claim 11, further comprising:

outputting a bounding box corresponding to the at least one image portion of the plurality of image portions.

13. The method of claim 12, further comprising:

performing at least one of automatic focus, automatic gain, automatic exposure, and automatic white balance based on the bounding box.

14. The method of claim 11, wherein the trained machine learning process comprises establishing a neural network.

15. The method of claim 14, wherein the neural network comprises a plurality of convolutional layers, a flattening layer, and a linear layer configured to generate at least one fully connected layer that provides the object value and the class value.

16. The method of claim 11, further comprising:

obtaining temporal data characterizing at least one previously generated confidence value; and applying the trained machine learning process to the temporal data to generate the object value and the class value.

17. The method of claim 11, further comprising:

applying the trained machine learning process to the image data to generate a keypoint value for each of the plurality of image portions of the image data; and outputting the keypoint value for each of the plurality of image portions of the image data.

18. The method of claim 11, further comprising:

applying the trained machine learning process to the image data to generate a visible keypoint value for each of the plurality of image portions of the image data; and outputting the visible keypoint value for each of the plurality of image portions of the image data.

19. A non-transitory, machine-readable storage medium storing instructions that, when executed by at least one processor, cause the at least one processor to perform operations that include:

obtaining image data from a camera of an image capture device;

applying a trained machine learning process to the image data to generate an object value and a class value for each of a plurality of image portions of the image;

determining, for each of the plurality of image portions, a confidence value based on the object value and the class value corresponding to each image portion; and detecting an object within at least one image portion of the plurality of image portions based on the confidence values.

20. The non-transitory, machine-readable storage medium of claim 19, wherein the instructions, when executed by the at least one processor, cause the at least one processor to perform operations including:

outputting a bounding box corresponding to the at least one image portion of the plurality of image portions.

* * * * *